(12) United States Patent
Chen et al.

(10) Patent No.: US 12,414,008 B2
(45) Date of Patent: Sep. 9, 2025

(54) DATA TRANSMISSION METHOD, APPARATUS, DEVICE AND STORAGE MEDIUM

(71) Applicant: GUANGDONG OPPO MOBILE TELECOMMUNICATIONS CORP., LTD., Guangdong (CN)

(72) Inventors: Wenhong Chen, Dongguan (CN); Jia Shen, Dongguan (CN); Zhi Zhang, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 814 days.

(21) Appl. No.: 17/588,015

(22) Filed: Jan. 28, 2022

(65) Prior Publication Data

US 2022/0159507 A1    May 19, 2022

Related U.S. Application Data

(63) Continuation of application No. PCT/CN2019/100216, filed on Aug. 12, 2019.

(51) Int. Cl.
  *H04W 28/04* (2009.01)
  *H04L 1/08* (2006.01)
  *H04L 1/1607* (2023.01)
(52) U.S. Cl.
  CPC .............. *H04W 28/04* (2013.01); *H04L 1/08* (2013.01); *H04L 1/1607* (2013.01)

(58) Field of Classification Search
  CPC ........ H04W 28/04; H04L 1/08; H04L 1/1607; H04L 1/1825; H04L 1/1864; H04L 1/203
  See application file for complete search history.

(56) References Cited

U.S. PATENT DOCUMENTS

| | | | |
|---|---|---|---|
| 2006/0146762 A1 | 7/2006 | Kuroda et al. | |
| 2012/0057545 A1 | 3/2012 | Hariharan et al. | |
| 2017/0164231 A1* | 6/2017 | Quan | H04W 28/04 |
| 2019/0364492 A1* | 11/2019 | Azizi | H04W 4/021 |
| 2020/0059327 A1* | 2/2020 | Kini | H04L 5/0055 |

(Continued)

FOREIGN PATENT DOCUMENTS

| | | |
|---|---|---|
| CN | 101170725 A1 | 4/2008 |
| CN | 102655448 A | 9/2012 |

(Continued)

OTHER PUBLICATIONS

International Search Report (ISR) dated May 9, 2020 for Application No. PCT/CN2019/100216.

(Continued)

*Primary Examiner* — Abdullahi Ahmed
(74) *Attorney, Agent, or Firm* — Ladas & Parry, LLP

(57) ABSTRACT

Embodiments of the present application provide a data transmission method, an apparatus, a device and a storage medium, where in the method, a new transmission manner is provided for the transmission of high-rate and high-error-tolerant first type of data, and the transmission manner includes at least one of a first verification mode, a first retransmission mode, and a first RLC mode, by using the new transmission mode to transmit the first type data, thus a transmission rate is ensured.

15 Claims, 14 Drawing Sheets

(56) References Cited

U.S. PATENT DOCUMENTS

| | | | |
|---|---|---|---|
| 2021/0099251 A1* | 4/2021 | Podlozhnyuk | H03M 13/1111 |
| 2021/0306182 A1* | 9/2021 | Kim | H04L 5/0048 |
| 2023/0198663 A1* | 6/2023 | Stoica | H04L 1/0041 |
| | | | 714/726 |
| 2024/0188166 A1* | 6/2024 | Mo | H04W 72/232 |
| 2024/0193019 A1* | 6/2024 | Wu | G06F 9/544 |
| 2024/0205805 A1* | 6/2024 | Boccuzzi | H04W 48/18 |

FOREIGN PATENT DOCUMENTS

| | | |
|---|---|---|
| CN | 103326832 A1 | 9/2013 |
| CN | 104486793 A1 | 4/2015 |
| WO | 2018204491 A1 | 11/2018 |
| WO | 2021026728 A1 | 2/2021 |

OTHER PUBLICATIONS

Written Opinion of the International Searching Authority in International Application No. PCT/CN2019/100216, dated May 9, 2020 with English translation provided by Google Translate.

The Extended Search Report of corresponding European application No. 19941087.9, dated Jul. 20, 2022.

\* cited by examiner

DATA TRANSMISSION METHOD, APPARATUS, DEVICE AND STORAGE MEDIUM

CROSS-REFERENCE TO RELATED APPLICATIONS

This application is a continuation of International Application No. PCT/CN2019/100216, filed on Aug. 12, 2019, the disclosure of which is hereby incorporated by reference in its entirety.

TECHNICAL FIELD

Embodiments of the present application relate to the field of communication technologies and, in particular, to a data transmission method, an apparatus, a device and a storage medium.

BACKGROUND

For the 5th generation mobile communication networks (abbreviation: 5G) new radio (abbreviation: NR) system, there are currently three major scenarios, namely, enhanced mobile broadband (abbreviation: eMBB) service, ultra reliable low latency communications (abbreviation: URLLC) service and massive machine type of communication (abbreviation: mMTC) service, these three types of services correspond to high-rate service, high-reliability and low-latency service, and large-connection service respectively. In recent years, artificial intelligence researches represented by neural networks has made great achievements in many fields, which will also play an important role in production and life of peoples for a long time in the future.

For a neural network, it needs a long training process to adjust various parameters in the network. In this training process, a very large training set is need to be used by the neural network. Generally speaking, the larger the training set and the more complete the features contained, the better the performance of the trained neural network. After the training of a neural network is completed, the neural network can be used in a targeted manner to complete specific tasks. Specifically, taking a neural network used for image recognition as an example, a data set used to train the neural network may be several hundred G or more, such as several T, if user equipment (abbreviation: UE) needs to train a neural network, and the UE needs to obtain an existing data set as a training set from other UEs or the network side, a data download workload of the training set of several hundred G or more will be very large. Therefore, for the neural network training set, which is a data set with a large amount of data, high-rate transmission is required to ensure that the data transmission time is not too long. Besides, in addition to the case where the UE obtains the training set from the network side, there is another scenario where the UE transmits a collected data set to the network side so that the network can obtain a larger training set for neural network training. Similarly, the transmission of the training set at this time will be a transmission of a very large data set, and when these training sets are transmitted with the goal of training network parameters, there is also a higher demand for speed and a higher tolerance for error rates.

The extensive use of neural networks will bring about the transmission requirements of training sets, and data characteristics of the training sets are very different from the requirement characteristics of the traditional data transmission. However, for such special data types and their corresponding transmission requirements, there are bottlenecks in the design of traditional data scheduling mechanisms. At present, no corresponding data transmission design has been made for high-rate and high-error-tolerant services.

SUMMARY

Embodiments of the present application provide a data transmission method, an apparatus, a device, and a storage medium, which provide a data transmission solution for high-rate and high-error-tolerant data.

In a first aspect, an embodiment of the present application may provide a data transmission method, which is applied to a first device, and the method includes:
    obtaining first type of data according to a first transmission manner, where the first transmission manner includes at least one of the following: a first verification mode used for transmitting the first type of data, a retransmission mode used for transmitting the first type of data, and a first radio link control (abbreviation: RLC) mode used for transmitting the first type of data.

In an implementation of the data transmission method, the method further includes:
    receiving second information, where the second information is used to activate the first transmission manner for transmitting the first type of data.

In an implementation, the second information includes any one of the following:
    a media access control-control element (abbreviation: MAC CE); downlink control information (abbreviation: DCI); uplink control information (abbreviation: UCI); and an uplink message during a random access process.

In a second aspect, an embodiment of the present application may provide a data transmission method, which is applied to a second device, and the method includes:
    transmit first type of data to a first device according to a first transmission manner, where the first transmission manner includes at least one of the following: a first verification mode used for transmitting the first type of data, a retransmission mode used for transmitting the first type of data, and a first RLC mode used for transmitting the first type of data.

In an implementation of the data transmission method, the method further includes:
    sending second information, where the second information is used to activate the first transmission manner for transmitting the first type of data.

In an implementation, the second information includes any one of the following:
    a MAC CE; DCI; UCI; and an uplink message during a random access process.

In a third aspect, an embodiment of the present application may provide a data transmission apparatus, including:
    a processing module, configured to obtain first type of data according to a first transmission manner, where the first transmission manner includes at least one of the following: a first verification mode used for transmitting the first type of data, a retransmission mode used for transmitting the first type of data, and a RLC mode used for transmitting the first type of data.

In a specific implementation of the data transmission apparatus, the apparatus further includes:
    a receiving module, configured to receive second information, where the second information is used to activate the first transmission manner for transmitting the first type of data.

In an implementation, the second information includes any one of the following:
a MAC CE; DCI; UCI; and an uplink message during a random access process.

In a fourth aspect, an embodiment of the present application may provide a data transmission apparatus, and the apparatus includes:
a sending module, configured to transmit first type of data to a first device according to a first transmission manner; where the first transmission manner includes at least one of the following: a first verification mode used for transmitting the first type of data, a retransmission mode used for transmitting the first type of data, and a RLC mode used for transmitting the first type of data.

In an implementation of the data transmission apparatus, the sending module is further configured to:
send second information, where the second information is used to activate the first transmission manner for transmitting the first type of data.

In an implementation, the second information includes any one of the following:
a MAC CE; DCI; UCI; and an uplink message during a random access process.

In a fifth aspect, an embodiment of the present application may provide an electronic device, including:
a processor, a memory, and an interface for communicating with a network device;
the memory stores computer-executable instructions; and
the processor executes the computer-executable instructions stored in the memory to enable the processor to execute the data transmission method according to any one of the first aspect.

In a sixth aspect, an embodiment of the present application may provide an electronic device, including:
a processor, a memory, and an interface for communicating with user equipment;
the memory stores computer-executable instructions; and
the processor executes the computer-executable instructions stored in the memory to enable the processor to execute the data transmission method according to any one of the second aspect.

In a seventh aspect, an embodiment of the present application may provide a computer-readable storage medium, where the computer-readable storage medium stores computer-executable instructions, and the computer-executable instructions are configured to implement the data transmission method according to any one of the first aspect.

In an eighth aspect, an embodiment of the present application may provide a computer-readable storage medium, where the computer-readable storage medium stores computer-executable instructions, and the computer-executable instructions are configured to implement the data transmission method according to any one of the second aspect.

The data transmission method, apparatus, device, and storage medium provided in the embodiments of the present application provide a new transmission manner for the transmission of high-rate and high-error-tolerant first type of data, and the transmission manner includes at least one of a first verification mode, a first retransmission mode, and a first RLC mode, by using the new transmission mode to transmit the first type data, thus a transmission rate is ensured.

BRIEF DESCRIPTION OF THE DRAWINGS

In order to more clearly describe the technical solution in embodiments of the present application or the prior art, the following will briefly introduce the drawings that need to be used in the description of the embodiments or the prior art. Apparently, the drawings in the following description are a part of embodiments of the present application. For the persons of ordinary skill in the art, other drawings can be obtained based on these drawings without creative labor.

DESCRIPTION OF EMBODIMENTS

In order to make the purpose, the technical solution, and the advantage of embodiments of the present application clearer, the technical solution in embodiments of the present application will be clearly and completely described below with reference to the accompanying drawings. Apparently, the described embodiments are merely a part rather than all embodiments of the present application. All other embodiments obtained by persons of ordinary skill in the art based on embodiments in the present application without paying creative labor shall fall within the protection scope of the present application.

The terms "first", "second", etc. in the description, claims, and the foregoing drawings of the embodiments of the present application are used to distinguish similar objects, and are not used to describe a specific order or sequence. It should be understood that data used in this way can be interchanged under appropriate circumstances, so that the embodiments of the present application described herein can be implemented, for example, in a sequence other than those illustrated or described herein. In addition, the terms "including" and "having" and any variations of them are intended to cover non-exclusive inclusions. For example, a process, method, system, product, or device that includes a series of steps or units is not necessarily limited to those clearly listed steps or units, but may include other steps or units that are not clearly listed or are inherent to these processes, methods, products, or equipment.

Figure 1:
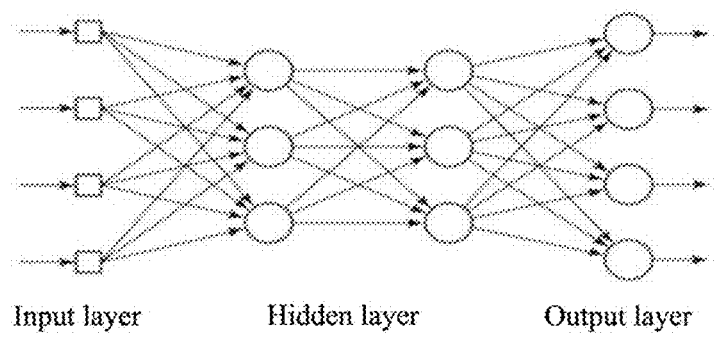
FIG. 1 is a structure schematic diagram of a neural network.

FIG. 1 is a structure schematic diagram of a neural network. As shown in FIG. 1, a basic structure of a simple neural network includes: an input layer, a hidden layer and an output layer. The input layer receives data, the hidden layer processes the data, and the final result is produced in the output layer. Among them, each node represents a processing unit, which can be considered as simulating a neuron. Multiple neurons form a layer of neural network, and information transmission and processing on the multiple layers construct a whole neural network.

Figure 2:
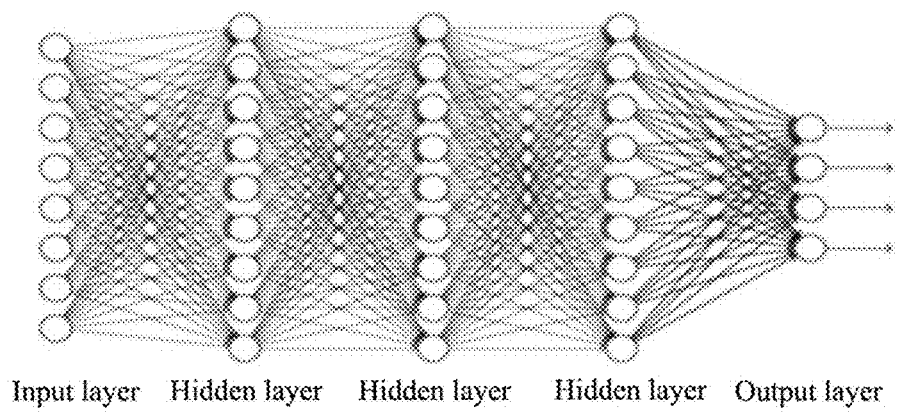
FIG. 2 is a structure schematic diagram of another neural network.

With the continuous development of neural network research, in recent years, neural network deep learning algorithms have been proposed, and more hidden layers have been introduced. FIG. 2 is a structure schematic diagram of another neural network. As shown in FIG. 2, a feature learning is performed through layer-by-layer training of the neural network with multiple hidden layers, which greatly improves the learning and processing capabilities of the neural network, and is widely used in the pattern recognition, the signal processing, the optimized combination, and the anomaly detection.

Combined with the description of the background technology, the purpose of transmission of these training sets is not to transmit the data itself, but to train the model. Therefore, when the amount of data in the training set is large enough, even if the error rate is high, the total amount of correct parts is extremely large. Besides, in addition to the case where the user equipment (abbreviation: UE) obtains the training set from the network side, there is also a scenario where the UE transmits a collected data set to the network side so that the network can obtain a larger training set for neural network training. Similarly, the transmission of the training set at this time will be a transmission of a very large data set, and when these training sets are transmitted with the goal of training network parameters, there is also a demand for speed and a tolerance for error rates.

In summary, the extensive use of neural networks will bring about the transmission requirements of training sets, and data characteristics of the training sets are very different from the requirement characteristics of the traditional data transmission. For such special data types and their corresponding transmission requirements, there are bottlenecks in the design of traditional data scheduling mechanisms. At present, the existing technology design does not consider the existence and requirements of such special data type. In addition, apparently, it is best if it is possible to provide a transmission with extremely high-rate while ensuring low-error-rate. However, in actual situations, it is difficult to achieve high-rate and low-error-rate transmission, or it depends on a channel seriously. For example, in order to ensure low-error-rate when the channel condition is not good, the system cannot perform a manner such as a high order modulation to increase the transmission rate. When two performance characteristics cannot be met at the same time, it is necessary to consider sacrificing one characteristic to satisfy the other as much as possible. That is to say, for the purpose of data set transmission and its own characteristics, according to the data set transmission purpose and its own characteristics, it is possible to increase the overall data transmission rate at the cost of tolerating certain data transmission errors, so as to ensure that the amount of correct part of the data that can be successfully transmitted per unit time is large enough. The requirement for error rate in traditional systems cannot be too low, which limits the transmission rate accordingly. The high-rate and low-error-tolerant services represented by the training set can further ease up the requirements for an error rate of the data transmission, so high order modulation and other manners can be used as much as possible to ensure the transmission rate, and break or redesign the performance guarantee mechanisms such as a verification and a retransmission used in traditional data scheduling, so as to ensure that the total amount of correctly transmitted data in a short period is large enough.

In view of the aforementioned existing problem, the present application focuses on a type of high-rate and high-error-tolerant data transmission. There is no need for this type of service in traditional services, and there is generally no such service scenario in traditional services. For example, it is impossible to accept that an experience of video service intermittently in traditional services. However, with the widespread application of neural networks and similar data applications, demands for such services have emerged. Therefore, the present application proposes a new data transmission method to solve the aforementioned problem.

The data transmission solution provided in the present application can be applied between a network device and UE, that is, such solution may be applied in a process of an uplink data transmission or a downlink data transmission, and may also be applied in a process of device-to-device data transmission, which is not limited in this solution. In the following specific examples, the data transmission between the network device and the UE is taken as an example to illustrate the solution.

The subsequent examples mainly involve two aspects of an uplink data transmission and a downlink data transmission. The data transmission method provided in the present application will be described in detail below through several specific embodiments.

Figure 3:
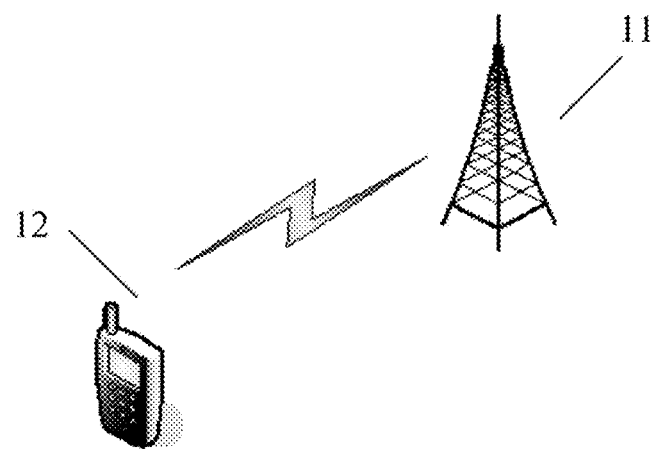
FIG. 3 is a schematic diagram of a communication system applied in an embodiment of the present application.

FIG. 3 is a schematic diagram of a communication system applied in an embodiment of the present application. As shown in FIG. 3, in an implementation of the data transmission, an applicable communication system includes at least network device 11 and UE 12. It could be understood that, in an actual communication system, there may be one or more network devices 11 and UE 12, and FIG. 2 only takes one network device and one UE as an example.

In FIG. 3, network device 11 may be an access device in a cellular network, for example, it may be an access device in a long term evolution (abbreviation: LTE) network, an advanced long-term evolution (abbreviation: LTE-A) network or its evolved network; for example, an evolutional NodeB (abbreviation: eNB or eNodeB), or a relay station, or a 5G base station, or a base station in a new network system in the future, etc., whose example of coverage is an area within the solid circle. It may also be a device such as an access point (abbreviation: AP) in a wireless local area network (abbreviation: WLAN).

UE 12 may also be referred to as a mobile terminal, an access terminal, a user unit, a user station, a mobile station, a mobile platform, a user terminal, a terminal, a wireless communication device, a user agent, or a user apparatus. Specifically, it can be a computer, a smart phone, a cellular phone, a cordless phone, a personal digital assistant (abbreviation: PDA) device, a handheld device with wireless communication function or another processing device connected to a wireless modem, an in-vehicle device, a wearable device, etc. In embodiments of the present application, the UE has an interface for communicating with a network device.

Figure 4:
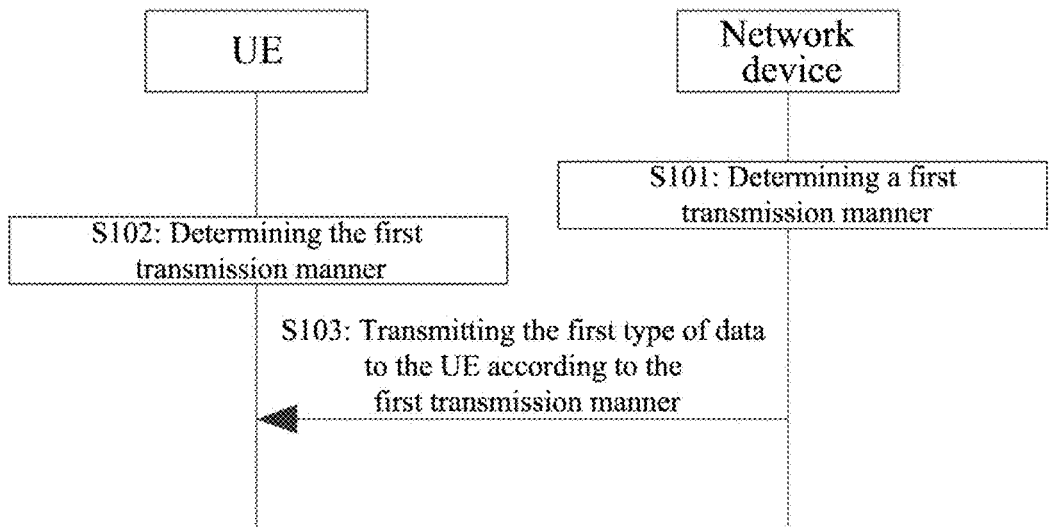
FIG. 4 is a schematic flowchart of a first embodiment of a data transmission method provided by the present embodiment.

FIG. 4 is a schematic flowchart of a first embodiment of a data transmission method provided by the present embodiment. As shown in FIG. 4, the data transmission method is applied between the UE and the network device. This solution is a downlink transmission process, which specifically includes the following steps:

S101: determining a first transmission manner.

In this solution, when the network device needs to transmit first type of data to the UE, a first transmission manner for transmitting the first type of data need to be obtained first, where the first transmission manner includes at least one of the following: a first verification mode used for transmitting the first type of data, a retransmission mode used for transmitting the first type of data, and a first radio link control (abbreviation: RLC) mode used for transmitting the first type of data. In this solution, it should be understood that the first type of data refers to data that requires high transmission rate and has a certain error tolerance rate, that is, high-rate and high-error-tolerant data, which is similar with the training data of the aforementioned neural network, or other service data with the same characteristics, which is not limited in this solution.

The first transmission manner may be at least one of the first verification mode, the first retransmission mode, and the first RLC mode, or may be a combination of several of them.

In a specific implementation of the solution, it should be understood that the first verification mode includes the following situations:

In a first situation, the first type of data being transmitted without performing a verification.

In a second situation, when transmitting the first type of data, performing a verification on the first type of data according to a first data granularity, where data of the first data granularity includes data of multiple sub-granularities; and determining that the verification fails when an error rate of the verification is greater than a first error rate for each data of the first data granularity; where the error rate is used to indicate a number of sub-granularities with a verification error, or to indicate a proportion of sub-granularities with a verification error in the first data granularity.

The meaning of this situation is to perform the verification for a larger data granularity, where the data granularity includes some data in sub-granularities. During the verification process, if a number of sub-granularities with an error or a proportion of sub-granularities with an error exceeds a preset number or a preset proportion, it is determined that the verification fails, and feedback to a sending end device. Otherwise, there is no need for feedback and data retransmission. In this solution, one or more of the first data granularity, the sub-granularity, and the first error rate may be preset, for example, it may be set through an agreement of a protocol, or configured according to a service type; and then it may be agreed by the protocol, or instructed to the UE through a system message, or higher-layer signaling (such as an RRC message), in an implementation, it may also be activated through downlink control information (abbreviation: DCI) or media access control-control element (abbreviation: MAC CE) to activate the above parameters, which is not limited in this solution.

In a third situation, when transmitting the first type of data, performing a verification on the first type of data according to a second data granularity; and determining the verification fails when an error rate of the verification is greater than a second error rate; where the error rate is used to indicate a number or a proportion of data with a verification error in the second data granularity.

The meaning of this situation is to perform the verification according to a larger data granularity when transmitting the first type of data; and determine the verification fails when a number or a proportion of the data with a verification error exceeds a certain preset value. Otherwise, there is no need for feedback and data retransmission. Similar to the above, in this solution, one or more of the second data granularity and the second error rate may be preset, for example, it may be set through an agreement of a protocol, or configured according to a service type; and then it may be agreed by the protocol, or instructed to the UE through a system message, or higher-layer signaling (such as an RRC message), in an implementation, it may also be activated through DCI or MAC CE to activate the above parameters, which is not limited in this solution.

In any of the above situations, the verification includes a cyclic redundancy check (abbreviation: CRC), and may also be other verification methods, which is not limited in this solution.

Similarly, the first retransmission mode includes the following situations:

In a first situation, the first type of data being transmitted without performing a retransmission feedback.

In a second situation, when transmitting the first type of data, performing a detection on the first type of data according to a third data granularity, and data of the third data granularity includes data of multiple sub-granularities; and performing a retransmission feedback when an error rate of the detection is greater than a third error rate for each data of the third granularity data; where the error rate is used to indicate a number of sub-granularities with a detection error, or to indicate a proportion of sub-granularities with a detection error in the third data granularity.

The meaning of this situation is to perform a reception detection for a larger data granularity, where the data granularity includes some data in sub-granularities. During the detection process, if a number of sub-granularities with an error or a proportion of sub-granularities with an error exceeds a preset number or a preset proportion, performing a retransmission feedback to a sending end device; otherwise, there is no need for feedback and data retransmission. In this solution, one or more of the third data granularity, the sub-granularity, and third error rate may be preset, for example, it may be set through an agreement of a protocol, or configured according to a service type; and then it may be agreed by the protocol, or instructed to the UE through a system message, or higher-layer signaling (such as an RRC message), in an implementation, it may also be activated through DCI or MAC CE to activate the above parameters, which is not limited in this solution.

In a third situation, when transmitting the first type of data, performing a detection on the first type of data according to a fourth data granularity; and determining to perform a retransmission feedback when an error rate is greater than a fourth error rate; where the error rate is used to indicate a proportion of data with detection errors in the fourth data granularity.

The meaning of this situation is to perform a retransmission detection according to a larger data granularity when transmitting the first type of data; if a number or a proportion of the data with detection errors exceeds a certain preset value, performing a retransmission feedback to a sending end device; otherwise there is no need for feedback and data retransmission. Similar to the above, in this solution, one or more of the fourth data granularity and the fourth error rate may be preset, for example, it may be set through an agreement of a protocol, or configured according to a service type; and then it may be agreed by the protocol, or instructed to the UE through a system message, or higher-layer signaling (such as an RRC message), in an implementation, it may also be activated through DCI or MAC CE to activate the above parameters, which is not limited in this solution.

In the above several situations, the retransmission feedback includes a hybrid automatic repeat request (abbreviation: HARQ) feedback, that is, when it is determined that data retransmission is required, a NACK message is sent to the sending end to request a retransmission.

In a specific implementation of this solution, it should be understood that the first RLC mode includes the following situations:

In a first situation, a notification message for notifying a data reception status being not sent.

In a second situation, feeding back to a network device a notification message for notifying a data reception status when an amount of data missing reaches a first threshold. In this solution, it should be understood that the first threshold is preset, for example, it is set by an agreement of a protocol; or, after being configured by a service type, it is configured to the UE by a system message or higher-layer signaling (such as an RRC message); or, configuring multiple thresholds to the UE through higher-layer signaling (such as an RRC message), and subsequently activating through DCI or MAC CE.

A specific method for the network device to determine the aforementioned first transmission manner is to use a correspondence between the data type and the transmission mode specified in the protocol or pre-configured. When it is determined that the data sent is the first type of data, the first transmission manner is determined directly based on the data type and the correspondence.

S102: determining the first transmission manner.

In this step, before receiving the first type of data transmitted by the network device, the UE also needs to determine the first transmission manner for the network device to transmit data, where the first transmission manner also includes at least one of the first verification mode used for transmitting the first type of data, the first retransmission mode used for transmitting the first type data, and the first RLC mode used for transmitting the first type data.

Among them, the specific situations included in the first verification mode, the first retransmission mode, and the first RLC mode are similar to the above, which may be referred to the description in step S101.

The solution for the UE to determine the first transmission manner includes at least the following:

In a first method, the UE receives configuration information, which is used to determine the first transmission manner and sent by the network device. The configuration information may directly carry the first transmission manner for the network device to transmit the first type of data, or only carry an indication of the data type or an indication of the transmission manner; and the UE determines the first transmission manner by itself after receiving the configuration information.

In a specific implementation of the manner, the configuration information may be carried by a system message or higher-layer signaling, that is: the network device broadcasts a system message including the configuration information, and the UE receives the system message to obtain the configuration information; or, the network device sends higher-layer signaling including the configuration information, for example: an RRC message carrying the configuration information, and the UE receives the RRC message to obtain the configuration information; where the RRC message may be an RRC connection establishment message or an RRC reconfiguration message, which is not limited in this method.

In a second method, the UE receives first information sent by the network device indicating that data to be transmitted is the first type of data, and then determines the first transmission manner according to the first information and the correspondence between the preset data type and the transmission mode.

Specifically, in an implementation, a realization of the first information includes two situations, and the first information may be configuration information and may also include DCI or MAC CE. In a specific implementation, in a situation, the first information is DCI or MAC CE, when the first type of data is specifically indicated, it is indicated by a preset field or a bit (one or more bits) in the DCI or the MAC CE, and the original information in the first information (i.e., DCI or MAC CE) still exists. In another situation, the first information is a part of the DCI or MAC CE, such as a preset field or a bit, and the first type of data is indicated through the first information (i.e., a preset field or one or more bits) in the DCI or MAC CE, which is not limited in this method.

The network device sends the first information indicating the first type of data, and the UE receives the first information, and determines the first transmission manner corresponding to the first type of data according to a correspondence between the data type and the transmission mode specified in the protocol or pre-configured. Specifically, the correspondence between the data type and the transmission mode may be configured by the network device to the UE, and the UE receives the correspondence, and then determines the first transmission manner according to the first information and the correspondence.

In the specific implementation of this method, it should be understood that the network device may indicate through a part of the DCI or the MAC CE, that is, the data to be transmitted may be indicated through the preset field or bits therein as the first type of data, and the original information in the DCI and MAC CE still exists.

In a third method, the UE receives second information sent by the network device to activate the first transmission manner of the first type of data, so as to determine the first transmission manner.

In this method, the network device sends the second information through MAC CE or DCI, where the second information is used to activate the first transmission manner; and the UE receives the second information and then determines the first transmission manner according to the second information. In a specific implementation of the method, the network device may be configured with multiple transmission manners, and during application, one of the multiple transmission manners or a combination of several manners is activated through the second information, which is not limited in this method. Similarly, the second information may be only a preset field or bit in the DCI or the MAC CE.

In this method, it should be understood that there is no sequence for steps S102 and S103, the UE can determine the first transmission manner while the network device transmits data.

S103: transmitting the first type of data to the UE according to the first transmission manner.

In this step, when the network device determines the first transmission manner for transmitting the first type of data, it sends the first type of data to the UE according to the first transmission manner. For the UE, it needs to detect and receive the first type of data sent by the network device according to the determined first transmission manner, that is, obtains the first type of data according to the first transmission manner.

Specifically, the network device sends the first type of data to the UE; and in order to increase the transmission rate of the first type of data, the UE may detect and receive the first type of data according to at least one of the first verification mode, the first retransmission mode, and the first RLC mode aforementioned when receiving the first type of data. For example, the UE may not perform a CRC verification on the received first-type data, or perform the verification according to a larger granularity. Or, during a process of the UE performing a verification or a detection on the received first type of data, it does not perform a retransmission feedback, that is to say, even though the data with a verification error exists, there is no need to feedback NACK to the network device and the network device does not need to retransmit. Or, the UE may feedback NACK to the network device when it detects that the data error reaches a preset error rate, and if the error rate does not reach the preset error rate, it does not need to feedback to the network device. Alternatively, the UE may not feedback the notification message of the reception status, for example, the UE may not send the notification message to the network device at the RLC layer, or the UE may feedback the reception status to the network device when an amount of data missing reaches a preset threshold, i.e., sending the notification message. The specific implementation of the method may be performed according to the multiple different implementations of the first transmission manner described above, which is not limited in this method.

Take data of a neural network, and a base station acting as the network device as an example to illustrate the above solution.

Regarding a data service of a type of neural network model training, this embodiment uses the first type of data as a representation. A characteristic of the business is high-rate and high-error-tolerant, in combination with the characteristic of this type of service, a data transmission method design for the high-rate and high-error-tolerant service is provided. The solution of the present application is expected to protect: for high-rate and high-error-tolerant service, it is possible to perform a data scheduling by manners of non-verification, non-detection, and non-feedback, or by mechanisms of a special verification, a special detection and a special feedback.

Instance I: The Base Station Configures a Verification Mode Used for Transmitting the First Type of Data (Training Set of the Neural Network) for the UE.

1. The base station configures a first verification mode (also called a first type of verification mode) need to be used for transmitting the first type of data.

a). The characteristic of the first verification mode includes that the UE does not perform a verification. That is, the UE does not perform any type of verification when receiving the first type of data, which can save verification time and resources.

b). A characteristic of the first verification mode is that the UE performs a verification for a larger data granularity (equivalent to the aforementioned first data granularity).

For example, the UE performs the verification for more first sub-granularities (transport block (abbreviation: TB) or code block group (abbreviation: CBG)) or more bits (for example, 10 Mbit), at the same time, the corresponding characteristic also includes that a certain proportion of the verification error rate (equivalent to the aforementioned first error rate) within the verification granularity is accepted. For example, when the verification error of the data within the feedback granularity exceeds a certain number, it is determined that the verification fails, for example, in the verification granularity of 10 Mbit, the UE determines that the verification fails when errors occurs exceeds 1 Mbit. Or, when a verification error rate of the data within the feedback granularity exceeds a preset threshold, it is determined that the verification fails. For example, when 20% of the bits have errors, the UE determines that the verification fails. For another example, when multiple first sub-granularities (TB or CBG) in the feedback granularity all have a verification error (exceeding a pre-configured or predefined threshold), the UE determines that the verification fails. For another example, when a proportion of multiple first sub-granularities (TB or CBG) with verification errors in the feedback granularity exceeds a pre-configured or predefined threshold (for example, 20% of TB verification fails), the UE determines that the verification fails.

c). A characteristic of the first verification mode is that the UE performs a verification for a larger granularity (equivalent to the aforementioned second data granularity). For example, the UE performs verification feedback for a larger TB size (for example, 10 Mbit), or a combination of a larger code rate and number of layers; at the same time, the characteristic also includes that a certain proportion of verification errors within the verification granularity is allowed. For example, when the verification error rate of data transmission within the verification granularity (equivalent to the aforementioned second error rate) exceeds a preset threshold, it is determined that the verification fails, for example, when 20% of the bits have errors, the UE determines the verification fails.

The verification in any one of the characteristics of the first verification mode includes a CRC verification. At the same time, the thresholds (including an absolute number or a proportion) involved in the above description are configurable, and the network side may configure differently for different service requirements. For example, a noise ratio of an acceptable data set for training neural network A is not exceed 50%, and a noise ratio of an acceptable data set for training neural network B is not exceed 20%, so that different thresholds may be configured. The specific configuration manner may be configuration through RRC signaling, or configuration of multiple through RRC and activation through MAC CE (or DCI).

Figure 5:
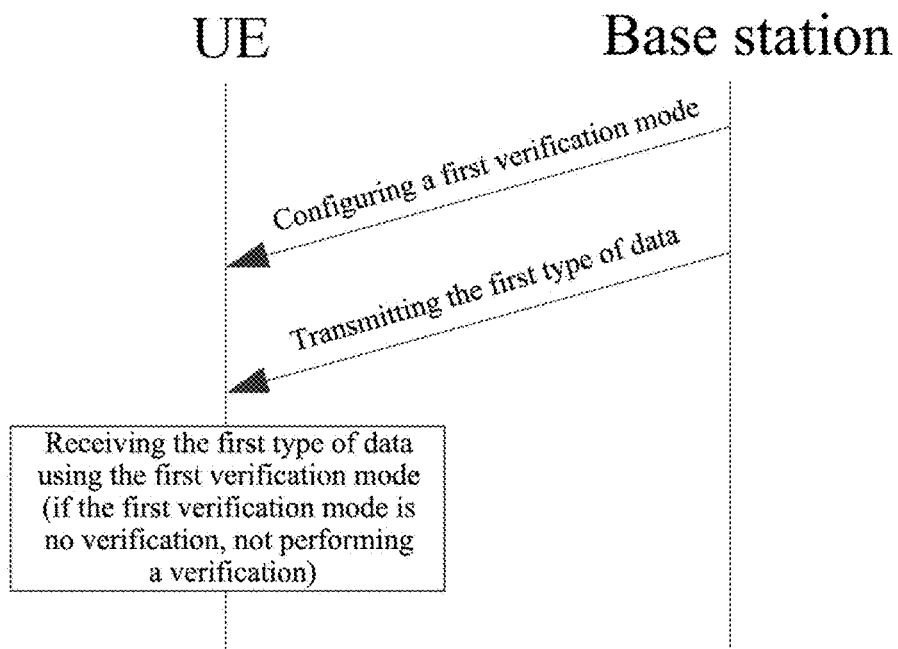
FIG. 5 is a schematic diagram of a configuration of a first verification mode provided by the present embodiment.
Figure 6:
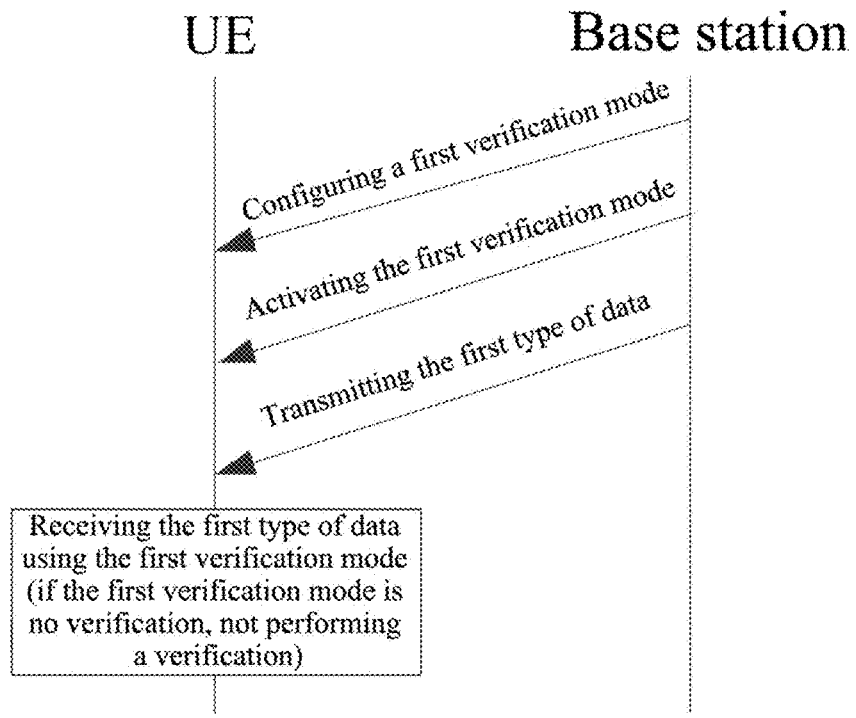
FIG. 6 is a schematic diagram of a configuration of another first verification mode provided by the present embodiment.
Figure 7:
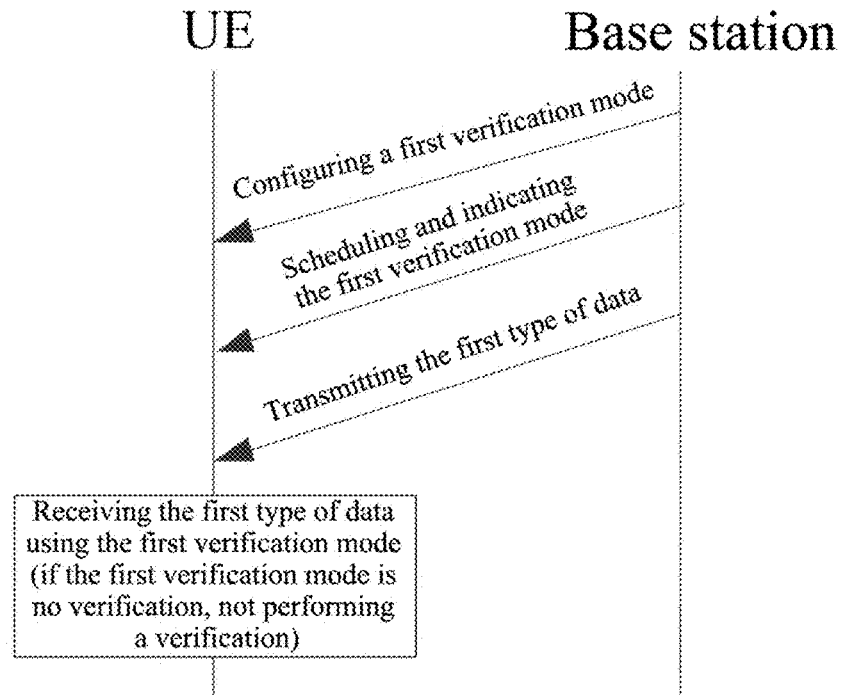
FIG. 7 is a schematic diagram of a configuration of yet another first verification mode provided by the present embodiment.

2. A configuration method of the first verification mode used for transmitting the first type of data.

a). The configuration of the first verification mode may be sent in a broadcast manner. FIG. 5 is a schematic diagram of a configuration of a first verification mode provided by the present embodiment. As shown in FIG. 5, for example, the configuration of the first verification mode may be carried in a system information block (abbreviation: SIB) 1 or in a SIB2, or in other SIBs. Configuration information of the first verification mode may also be configured by manners of RRC dedicated signaling, for example, through an RRC reconfiguration message to notify the UE that the transmission of the first type of data uses the first verification mode. Of course, the verification mode used for transmitting the first type of data may also be changed by reconfiguration or system information updating, and in addition, the verification mode for transmitting the first type of data may be determined by a pre-configuration manner. As shown in FIG. 5, this manner is equivalent to being effective for a long time after configuration.

b). The base station may determine the first verification mode by manners of pre-defining, broadcasting, or configuring by RRC dedicated signaling. FIG. 6 is a schematic diagram of a configuration of another first verification mode provided by the present embodiment. The base station indicates the use of the first verification mode through MAC CE or DCI. For example, the base station configures in the RRC dedicated signaling that the first verification mode is not performing a verification. Before transmitting the first type of data, the base station activates the first verification mode through MAC CE, and then the UE follows the first verification mode during the data transmission. As shown in FIG. 6, this manner is equivalent to temporary use when only transmitting the first type of data.

c). The base station indicates that the data transmission is the first type of data through the MAC CE or DCI, and the UE determines that the data transmission uses the first verification mode after receiving the indication information. FIG. 7 is a schematic diagram of a configuration of yet another first verification mode provided by the present embodiment. For example, the UE determines that the transmission of the first type of data uses the first verification mode by manners of predefining or agreeing by a protocol, or configured by an RRC configuration, or configured by a broadcast, then when the UE determines the current transmission data is the first type of data through MAC CE or DCI, the first verification mode is used. As shown in FIG. 7, this manner is equivalent to associate the first type of data with the first verification mode, and when the data is indicated as the first type of data during data scheduling, the transmission manner corresponding to the first type of data is used.

Instance II: The Base Station Configures a First Retransmission Mode Used for Transmitting the First Type of Data (Training Set of the Neural Network) for the UE, and the HARQ Mode is Taken as an Example in this Solution, the Subsequent First HARQ Mode Refers to the Aforementioned First Retransmission Mode (Also Referred to as the First Type of HARQ Mode).

1. The base station configures a first HARQ mode need to be used for transmitting the first type of data.

a). The characteristic of the first HARQ mode is that the UE does not perform a HARQ feedback, which means not performing a transmission detection and not performing a retransmission.

b). The characteristic of the first HARQ mode is that the UE performs a HARQ feedback for a larger data granularity (equivalent to the third data granularity in the aforementioned embodiment). For example, the UE performs the HARQ feedback for more sub-granularities (TB or CBG) or more bits (for example, 10 Mbit), at the same time, the corresponding characteristic also includes that a certain proportion of the detection error rate (equivalent to the third error rate in the aforementioned embodiment) within the feedback granularity of HARQ is allowed. For example, when the data or sub-granularity with a detection error within the feedback granularity exceeds a certain number (a pre-configured or predefined threshold), it performs a feedback to the base station, for example, in the detection granularity of 10 Mbit, a NACK is fed back to the network when errors occurs exceeds 1 Mbit. Or, when a detection error rate of the data or the sub-granularity exceeds a pre-configured or predefined threshold, it is determined that the verification fails. For example, when 20% of the bits have errors, a NACK is fed back to the base station. For another example, when multiple sub-granularities (TB or CBG) in the feedback granularity all have a verification error, a NACK is fed back to the base station. For another example, when a proportion of multiple sub-granularities (TB or CBG) of the feedback granularity have detection errors exceeds a pre-configured or predefined threshold (for example, 20% of TB detection fails), a NACK is fed back to the base station.

In other situations, feeding back or not feeding back ACK.

c). Or, the characteristic of the first HARQ mode is that the UE performs a HARQ feedback for a larger granularity. For example, the UE performs a HARQ feedback for a larger TB size (for example, 10 Mbit), or for a combination of a larger code rate and number of layers (equivalent to the fourth data granularity); at the same time, the characteristic also includes that a certain proportion of the error rate (equivalent to the aforementioned fourth error rate, also known as the bit error rate) within the feedback granularity is allowed. For example, when a detection error rate of a transmission of the data within the feedback granularity exceeds a preset threshold, it feeds back to the base station, for example, when 20% of the bits have errors, the UE feeds back NACK to the base station.

Among the aforementioned characteristics of the first HARQ modes, it should be understood that the thresholds (including an absolute number or a proportion) involved in the above description are configurable, and the network side may configure differently for different service requirements. For example, a noise ratio of an acceptable data set for training neural network A is not exceed 50%, and a noise ratio of an acceptable data set for training neural network B is not exceed 20%, so that different thresholds may be configured. The specific configuration manner may be configuration through RRC signaling, or configuration of multiple through RRC and activation through MAC CE (or DCI).

Figure 8:
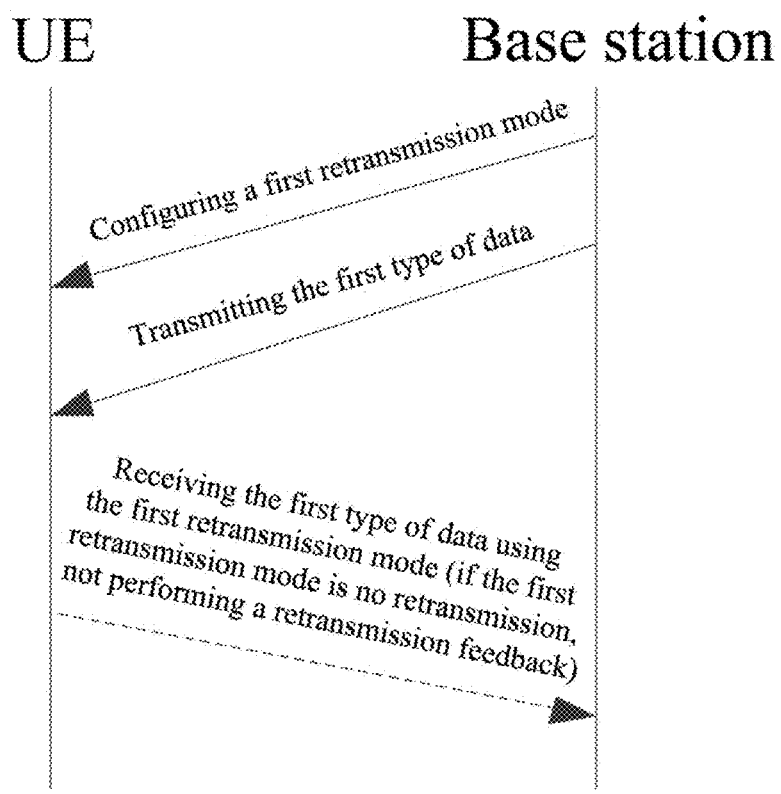
FIG. 8 is a schematic diagram of a configuration of a first retransmission mode provided by the present embodiment.
Figure 9:
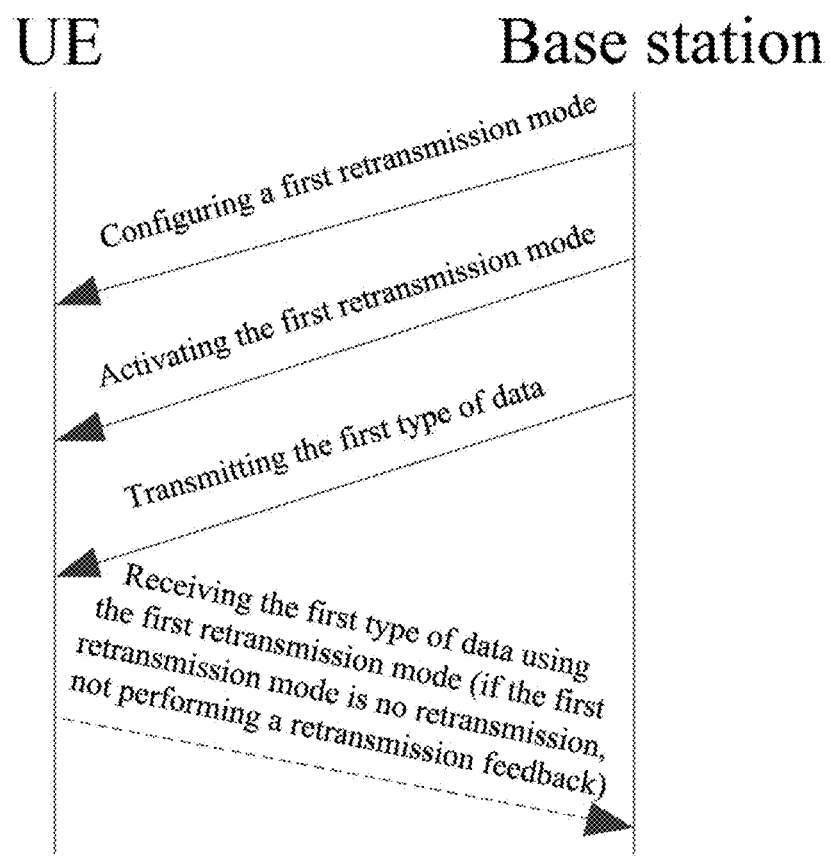
FIG. 9 is a schematic diagram of a configuration of another first retransmission mode provided by the present embodiment.
Figure 10:
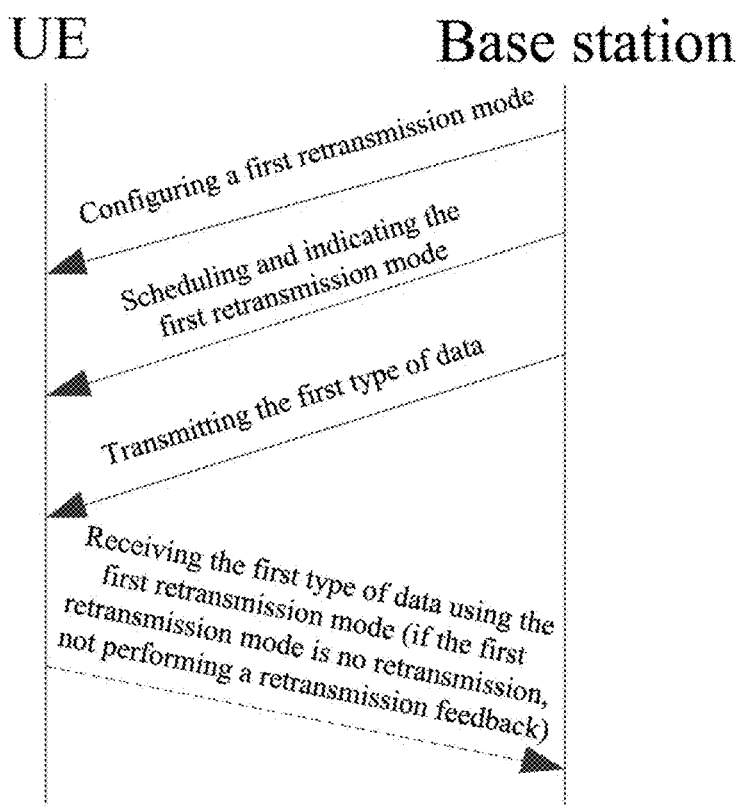
FIG. 10 is a schematic diagram of a configuration of yet another first retransmission mode provided by the present embodiment.

2. A configuration method of the first HARQ mode used for transmitting the first type of data.

a). The configuration of the first HARQ mode may be sent in a broadcast manner. FIG. 8 is a schematic diagram of a configuration of a first retransmission mode provided by the present embodiment. For example, the configuration of the first HARQ mode may be carried in a SIB1 or in a SIB2, or in other SIBs. Configuration information of the first HARQ mode may also be configured by manners of RRC dedicated signaling, for example, notifying the UE that the transmission of the first type of data uses the first HARQ mode through an RRC reconfiguration message. Of course, the HARQ mode used for transmitting the first type of data may also be changed by reconfiguration or system information updating, and in addition, the HARQ mode for transmitting the first type of data may be determined by a pre-configuration manner. As shown in FIG. 8, this manner is equivalent to being effective for a long time after configuration.

b). The base station may determine the first HARQ mode by manners of pre-defining, broadcasting, or configuring by RRC dedicated signaling. FIG. 9 is a schematic diagram of a configuration of another first retransmission mode provided by the present embodiment. The base station indicates the use of the first HARQ mode through MAC CE or DCI. For example, the base station configures in the RRC dedicated signaling that the first HARQ mode is not performing a HARQ. Before transmitting the first type of data, the base station activates the first HARQ mode through MAC CE, and then the UE follows the first HARQ mode during the data scheduling. As shown in FIG. 9, this manner is equivalent to temporary use when only transmitting the first type of data.

c). The base station indicates that the data transmission is the first type of data through the MAC CE or DCI, and the UE determines that the data transmission uses the first HARQ mode after receiving the indication information. FIG. 10 is a schematic diagram of a configuration of yet another first retransmission mode provided by the present embodiment. For example, the UE determines that the transmission of the first type of data uses the first HARQ mode by manners of predefined, or configured by an RRC configuration, or configured by a broadcast, then when the UE determines the current transmission data is the first type of data through MAC CE or DCI, the first HARQ mode is used. As shown in FIG. 10, this manner is equivalent to associate the first type of data with the first HARQ mode, and when the data is indicated as the first type of data during data scheduling, the first retransmission mode is used.

Instance III: The Base Station Configures a Transmission Manner Used for Transmitting the First Type of Data (Training Set of the Neural Network) for the UE, that is, Configure the First RLC Mode 1. The base station configures a first RLC mode need to be used for transmitting the first type of data.

a). The characteristic of the first RLC mode is that the RLC layer does not send a first notification message to notify a data reception status. The first RLC mode may be an unacknowledged mode (abbreviation: UM mode) in the existing system, or a transparent mode (abbreviation: TM mode). For example, the base station may configure the UE to use the UM mode for transmitting the first type of data, and use (or default to) an acknowledged mode (abbreviation: AM mode) for transmitting other types of data.

b). The characteristic of the first RLC mode is that the UE sends a second notification message to the base station when the UE determines that an amount of data missing at the RLC layer reaches a pre-configured or predefined threshold (a certain proportion, such as 20%, 50%; or a certain number, such as N data packet loss, equivalent to the first threshold value in the aforementioned embodiment). After receiving the second notification message, the base station retransmits the data that the UE has not received, and/or the base station adjusts a mode for transmitting the first type of data or a modulation parameter used. Similarly, the base station may configure the UE to use the first RLC mode for transmitting the first type of data (for example, triggering the RLC retransmission mechanism when the data loss rate reaches 50%), and use (or default to) a second RLC mode (for example, AM mode, or triggering the retransmission mechanism when the data loss rate reaches 5%) for transmitting other types of data.

In the description of the first RLC mode above, the thresholds (including an absolute number or a proportion) involved in the above description are configurable, and the network side may configure differently for different service requirements. For example, a noise ratio of an acceptable data set for training neural network A is not exceed 50%, and a noise ratio of an acceptable data set for training neural network B is not exceed 20%, so that different thresholds may be configured. The specific configuration manner may be configuration through RRC signaling, or configuration of multiple through RRC and activation through MAC CE (or DCI).

Figure 11:
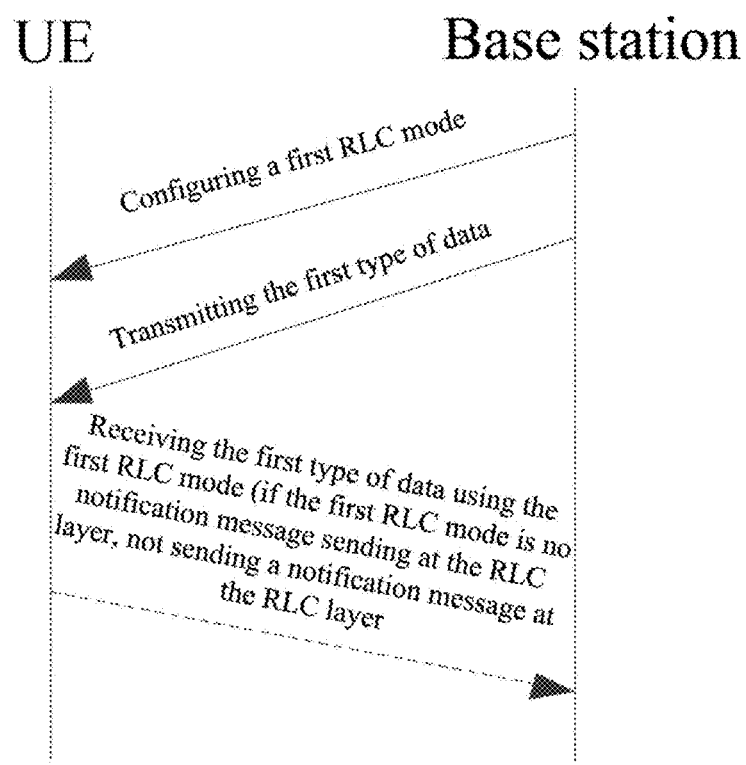
FIG. 11 is a schematic diagram of a configuration of a first RLC mode provided by the present embodiment.
Figure 12:
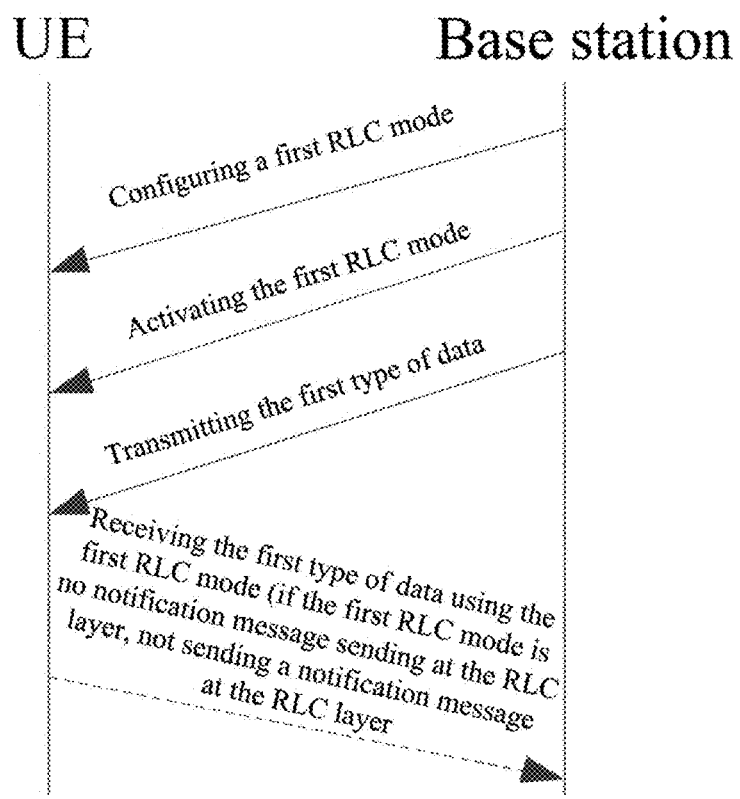
FIG. 12 is a schematic diagram of a configuration of another first RLC mode provided by the present embodiment.
Figure 13:
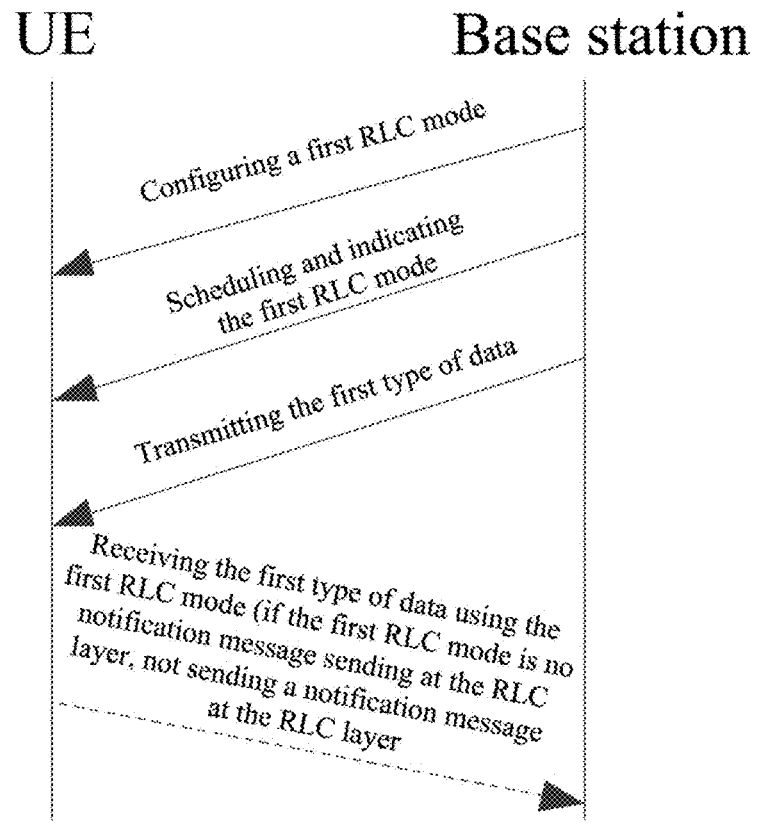
FIG. 13 is a schematic diagram of a configuration of yet another first RLC mode provided by the present embodiment.

2. A configuration manner of the first RLC mode used for transmitting the first type of data.

a). The configuration of the first RLC mode may be sent in a broadcast manner. FIG. 11 is a schematic diagram of a configuration of a first RLC mode provided by the present embodiment. For example, the configuration of the first RLC mode may be carried in a SIB1 or in a SIB2, or in other SIBs. Configuration information of the first RLC mode may also be configured by manners of RRC dedicated signaling, for example, notifying the UE that the transmission of the first type of data uses the first RLC mode through an RRC reconfiguration message. Of course, the RLC mode used for transmitting the first type of data may also be changed by reconfiguration or system information updating, and in addition, the RLC mode for transmitting the first type of data may be determined by a pre-configuration manner. As shown in FIG. 11, this manner is equivalent to being effective for a long time after configuration.

b). The base station may determine the first RLC mode to be used by manners of pre-defining, broadcasting, or configuring by RRC dedicated signaling, and the base station indicates the use of the first RLC mode through MAC CE or DCI. FIG. 12 is a schematic diagram of a configuration of another first RLC mode provided by the present embodiment. For example, the base station configures the first RLC mode that sending a first notification message to the base station when an amount of data missing at the RLC layer reaches a first threshold (for example, 50%) in the RRC dedicated signaling. Before transmitting the first type of data, the base station activates the first RLC mode through MAC CE, and then the UE follows the first RLC mode during the data scheduling. The UE will not notify the base station to request a data retransmission when the amount of data missing at the RLC layer is less than the first threshold. As shown in FIG. 12, this manner is equivalent to temporary use when only transmitting the first type of data.

c). The base station indicates that the data transmission is the first type of data through the MAC CE or DCI, and the UE determines that the data transmission uses the first RLC mode after receiving the indication information. FIG. 13 is a schematic diagram of a configuration of yet another first RLC mode provided by the present embodiment. For example, the UE determines that the transmission of the first type of data uses the first RLC mode by manners of predefined, or configured by an RRC configuration, or configured by a broadcast, then when the UE determines the current transmission data is the first type of data through MAC CE or DCI, the first RLC mode is used. As shown in FIG. 13, this manner is equivalent to associate the first type of data with the first RLC mode, and when the data is indicated as the first type of data during data scheduling, the first RLC mode is used.

The aforementioned scenarios are mainly for the transmission of high-rate and high-error-tolerant data such as a neural network training set, by scarifying a verification or using a special checks to directly allow the base station to schedule UE for transmitting data at high rate. For this type of service, it is acceptable as long as the error rate is not very high. For example, if 1T data is transmitted, 500G is successfully transmitted and 500G becomes noise. It may also be used after some post-processing or data cleaning when using such data as a training set. However, in addition to such scenarios, the method provided in the present application can actually be used for ordinary data transmission when the channel status is very good. For example, when the channel is particularly good, if the error rate and the packet loss rate of data transmission are very low, the method of the present application can reduce unnecessary feedback overhead, thereby further increasing a transmission rate and a system capacity.

In the aforementioned several embodiments, corresponding data transmission designs are made for a new type of typical data represented by the neural network training set. The amount of data of this type of data is large, which far exceeds the general data size of the current wireless network transmission. With the increasing use of neural networks, there must be an important demand for an air interface transmission of this type of data, but the data scheduling of the existing system is difficult to meet the demand for a large amount of fast transmission of this type of data. The technical solution of the present application proposes a data transmission design achieving high rate at the cost of high error tolerance by analyzing data characteristics. For a high-rate and high-error-tolerant service, providing manners such as no verification and no detection, or adopting solutions such as a special verification, a detection and a feedback mechanism, thereby a rapid transmission of large data or a large data set is ensured.

On the basis of the aforementioned embodiments, the technical solution provided in the present application may also be applied in processes such as a sidelink, a device-to-device (abbreviation: D2D) process, etc., and may also be applied in an uplink transmission process, which is not limited in this solution.

The following describes the process of applying this solution to an uplink transmission.

Figure 14:
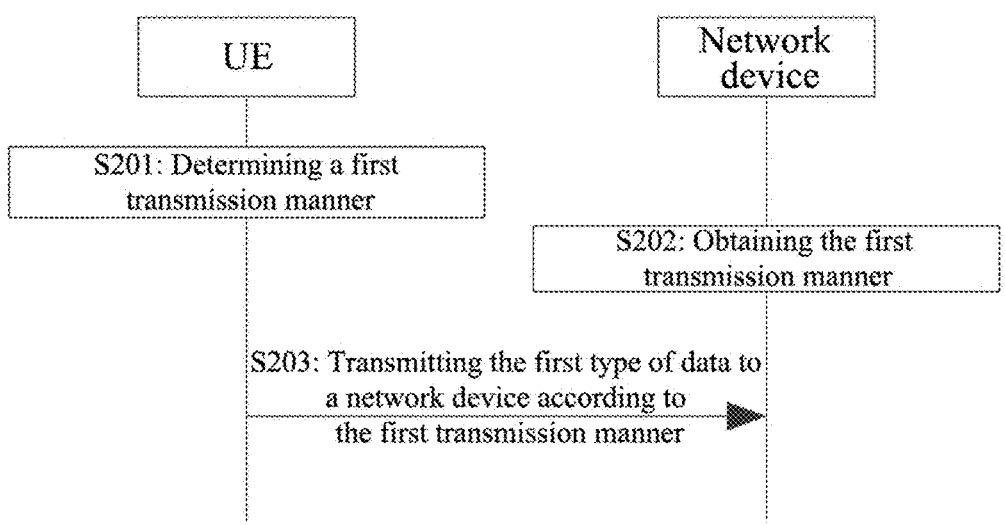
FIG. 14 is a schematic flowchart of a second embodiment of a data transmission method provided by the present embodiment.

FIG. 14 is a schematic flowchart of a second embodiment of a data transmission method provided by the present embodiment. As shown in FIG. 14, the data transmission method is applied between the UE and the network device, and this solution is an uplink transmission process, which specifically includes the following steps:

S201: determining a first transmission manner.

In this solution, when the UE needs to transmit first type of data to the network device, a first transmission manner for transmitting the first type of data need to be obtained first, where the first transmission manner includes at least one of the following: a first verification mode used for transmitting the first type of data, a retransmission mode used for transmitting the first type of data, and a first radio link control (RLC) mode used for transmitting the first type of data. In this solution, it should be understood that the first type of data refers to data that requires high transmission rate and has a certain error tolerance rate, that is, high-rate and high-error-tolerant data, which is similar with the training data of the aforementioned neural network, or other service data with the same characteristics, which is not limited in this solution.

The first transmission manner may be at least one of the first verification mode, the first retransmission mode, and the first RLC mode, or may be a combination of several of them.

In a specific implementation of the solution, it should be understood that the first verification mode includes the following situations:

In a first situation, the first type of data being transmitted without performing a verification.

In a second situation, when transmitting the first type of data, performing a verification on the first type of data according to a first data granularity, where data of the first data granularity includes data of multiple sub-granularities; and determining that the verification fails when an error rate of the verification is greater than a first error rate for each data of the first data granularity; where the error rate is used to indicate a number of sub-granularities with a verification error, or to indicate a proportion of sub-granularities with a verification error in the first data granularity.

The meaning of this situation is to perform the verification for a larger data granularity, where the data granularity includes some data in sub-granularities. During the verification process, if a number of sub-granularities with an error or a proportion of sub-granularities with an error exceeds a preset number or a preset proportion, it is determined that the verification fails, and feedback to a sending end device. Otherwise, there is no need for feedback and data retransmission. In this solution, one or more of the first data granularity, the sub-granularity, and the first error rate may be preset through a manner such as agreeing by a protocol, etc., or instructed by the network device through a system message, or higher-layer signaling (such as an RRC message) to the UE, in an implementation, it may also be activated by the network device through DCI or MAC CE to activate the parameters, which is not limited in this solution.

In a third situation, when transmitting the first type of data, performing a verification on the first type of data according to a second data granularity; and determining the verification fails when an error rate of the verification is greater than a second error rate; where the error rate is used to indicate a number or a proportion of data with a verification error in the second data granularity.

The meaning of this situation is to perform the verification according to a larger data granularity when transmitting the first type of data; and determine the verification fails when a number or a proportion of the data with a verification error exceeds a certain preset value. Otherwise, there is no need for feedback and data retransmission. Similar to the above, in this solution, one or more of the second data granularity and the second error rate may be preset through a manner such as agreeing by a protocol, etc., or instructed by the network device through a system message, or higher-layer signaling (such as an RRC message) to the UE, in an implementation, it may also be activated by the network device through DCI or MAC CE to activate the parameters, which is not limited in this solution.

In any of the above situations, the verification includes a CRC verification, and may also be other verification methods, which is not limited in this solution.

Similarly, in a specific implementation of this solution, the first retransmission mode includes the following situations:

In a first situation, the first type of data being transmitted without performing a retransmission feedback.

In a second situation, when transmitting the first type of data, performing a detection on the first type of data according to a third data granularity, and data of the third data granularity includes data of multiple sub-granularities; and performing a retransmission feedback when an error rate of the detection is greater than a third error rate for each data of the third granularity data; where the error rate is used to indicate a number of sub-granularities with a detection error, or to indicate a proportion of sub-granularities with a detection error in the third data granularity.

The meaning of this situation is to perform a reception detection for a larger data granularity, where the data granularity includes some data in sub-granularities. During the detection process, if a number of sub-granularities with an error or a proportion of sub-granularities with an error exceeds a preset number or a preset proportion, performing a retransmission feedback to a sending end device; otherwise, there is no need for feedback and data retransmission. In this solution, one or more of the third data granularity, the sub-granularity, and third error rate may be preset through a manner such as agreeing by a protocol, etc., or instructed by the network device through a system message, or higher-layer signaling (such as an RRC message) to the UE, in an implementation, it may also be activated by the network device through DCI or MAC CE to activate the parameters, which is not limited in this solution.

In a third situation, when transmitting the first type of data, detecting the first type of data according to a fourth data granularity; and determining to perform a retransmission feedback when an error rate is greater than a fourth error rate; where the error rate is used to indicate a proportion of data with detection errors in the fourth data granularity.

The meaning of this situation is to perform a retransmission detection according to a larger data granularity when transmitting the first type of data; if a number or a proportion of the data with detection errors exceeds a certain preset value, performing a retransmission feedback to a sending end device; otherwise there is no need for feedback and data retransmission. Similar to the above, in this solution, one or more of the fourth data granularity and the fourth error rate may be preset through a manner such as agreeing by a protocol, etc., or instructed by the network device through a system message, or higher-layer signaling (such as an RRC message) to the UE, in an implementation, it may also be activated by the network device through DCI or MAC CE to activate the parameters, which is not limited in this solution.

In the above several situations, the retransmission feedback includes a hybrid automatic repeat request (abbreviation: HARQ) feedback, that is, when it is determined that data retransmission is required, the receiving end sends a NACK message to the sending end to request a retransmission.

In a specific implementation of this solution, it should be understood that the first RLC mode includes the following situations:

In a first situation, a notification message for notifying a data reception status being not sent.

In a second situation, feeding back to the network device a notification message for notifying a data reception status when an amount of data missing reaches a first threshold. In this solution, it should be understood that the first threshold may be preset through a manner such as agreeing by a protocol, etc., or instructed by the network device through a system message, or higher-layer signaling (such as an RRC message) to the UE, in an implementation, it may also be activated by the network device through DCI or MAC CE to activate the parameters, which is not limited in this solution.

Before sending data, the UE needs to determine the first transmission manner, and make the network device at the receiving end know that the UE will use the first transmission manner to transmit the first type of data. The specific manner for the UE to determine the first transmission manner include at least the following:

In a first manner, determining the first transmission manner according to a correspondence between the data type and the transmission mode specified in the protocol. When determining that the data to be transmitted is the first type of data, the UE may obtain the first transmission manner corresponding to the first type of data according to the correspondence between the data type and the transmission mode agreed by the protocol.

In a second manner, determining the first transmission manner according to a pre-configured correspondence between the data type and the transmission mode. Similar to the above solution, except that the correspondence in this solution is pre-configured by the network device or set before leaving the factory, which is not limited in this solution.

In the above two manners, after determining that the data to be uploaded to the network device is the first type of data, the UE may also send the first information to the network device, where the first information is used to indicate to the network device that the type of data to be transmitted by the UE is the first type of data, so that the network device can determine the first transmission manner used by the UE according to the data type, and also obtain the first type of data according to the first transmission manner.

Alternatively, the network device may pre-configure multiple transmission manners for the UE, and when receiving the information sent by the UE indicating that the data to be transmitted is the first type of data, the network device activates one or a combination of multiple transmission manners through other information; and the UE determines the first transmission manner, which is not limited in this solution.

In a third manner, the UE sends the first information to the network device, where the first information is used to indicate that the data to be transmitted by the UE is the first type of data; the network device determines the first transmission manner according to the first information, and then indicates the first transmission manner to the UE through configuration information; and the UE receives the configuration information, where the configuration information is used to indicate the first transmission manner for transmitting the first type of data.

The network device may send the aforementioned configuration information to the UE by broadcasting a broadcast message carrying the configuration information, or sending an RRC message carrying the configuration information to the UE.

The aforementioned first information may be an uplink control information (abbreviation: UCI), or may be other uplink information in a random access process, which is not limited in this solution.

In the above several implementations, similar to the downlink transmission, the specific realization of the first information also includes two situations. In a situation, the first information is UCI or other uplink information in the random access process, when the first type of data is specifically indicated, it is indicated by a preset field or a bit (one or more bits) in the UCI or the other uplink information in the random access process, and the original information in the first information (i.e., the UCI or the other uplink information in the random access process) still exists. In another situation, the first information is a part of the UCI or the other uplink information in the random access process, such as a preset field or a bit, and the first type of data is indicated through the first information (i.e., a preset field or one or more bits) in the UCI or the other uplink information in the random access process, which is not limited in this solution.

S202: obtaining the first transmission manner.

In this step, the network device needs to obtain the first transmission manner in order to obtain the first type of data transmitted by the UE according to the first transmission manner. The first transmission manner includes at least one of the following: the first verification mode used for transmitting the first type of data, the first retransmission mode used for transmitting the first type data, and the first RLC mode used for transmitting the first type data. The specific situation is the same as the description in step S101 above, and reference may be made to the above description.

Corresponding to the UE side, the network device obtains the first transmission manner includes the following manners:

In a first manner, the network device receives the first information, where the first information is used to indicate that the data to be transmitted by the UE is the first type of data, and then determines the first transmission manner according to the correspondence between the data type and the transmission mode specified in the protocol or preconfigured and the first information. The first information in this solution may be a UCI or an uplink information in the random access process, or a part of the UCI or the uplink information in the random access process. In the specific implementation of the above solution, it should be understood that the UE may indicate through a part of the UCI or the other uplink information in the random access process, that is, the preset field or bit may be used to indicate that the data to be transmitted is the first type of data, and the original information in the UCI or the other uplink information in the random access process still exists.

In a second manner, the UE sends a message indicating that the first transmission manner is to be used to transmit the first type of data, and the network device directly determines the first transmission manner according to the message.

In a solution, the UE may only upload a data type of the first transmission manner is the first type of data, and the network device determines the first transmission manner according to the first type of data, and indicates the first transmission manner to the UE through the configuration information.

The specific manner for the network device to transmit the configuration information includes broadcasting a system message including the configuration information, or sending higher-layer signaling (such as an RRC message) including the configuration information to the UE, an RRC connection establishment message, or an RRC reconfiguration information, or other higher-layer signaling, which is not limited in this solution.

S203: transmitting the first type of data to the network device according to the first transmission manner.

There is no sequence for the above two steps. As long as the network device determines the first transmission manner before receiving the data transmitted by the UE. The UE transmits the first type of data to the network device according to the first transmission manner when determining the first transmission manner for transmitting the first type of data; and the network device detects and receives the first type of data transmitted by the UE according to the determined first transmission manner, that is, the network device obtains the first type of data according to the first transmission manner.

Specifically, in order to increase the transmission rate of the first type of data, the first type of data may be detected and received according to at least one of the first verification mode, the first retransmission mode, and the first RLC mode aforementioned. For example: not performing a CRC verification, or not performing a retransmission feedback, or not feeding back a notification message of the reception status at the RLC layer, or performing the verification or retransmission detection at a larger granularity, which may be performed according to the specific implementation of the first transmission manner.

According to the aforementioned embodiments, the data transmission solution of the present application may be used for an uplink transmission or a downlink transmission, it is also applicable in sidelink and D2D, and may also be used for larger data interactions between other two devices, to improve the transmission efficiency, which is not limited in this solution.

Figure 15:
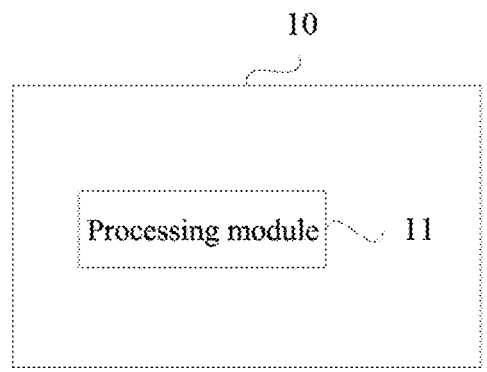
FIG. 15 is a structural schematic diagram of a first embodiment of a data transmission apparatus provided by an embodiment of the present application.

FIG. 15 is a structural schematic diagram of a first embodiment of a data transmission apparatus provided by an embodiment of the present application. As shown in FIG. 15, the data transmission apparatus 10 includes:

a processing module 11, configured to obtain the first type of data according to a first transmission manner, where the first transmission manner includes at least one of the following: a first verification mode used for transmitting the first type of data, a retransmission mode used for transmitting the first type of data, and a first RLC mode used for transmitting the first type of data The data transmission apparatus provided in this embodiment is configured to implement the technical solution at the UE side in any of the foregoing method embodiments, and the implementation principles and technical effects therebetween are similar, which will not be repeated here.

Figure 16:
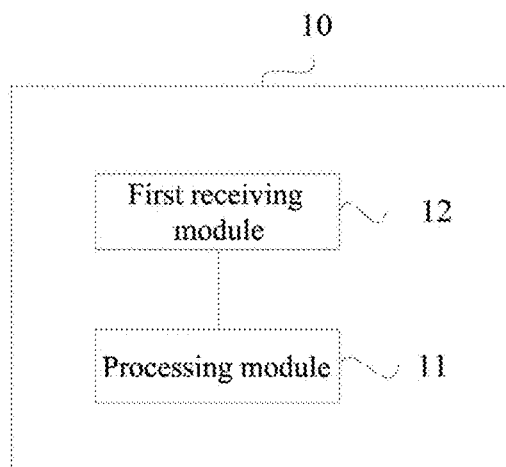
FIG. 16 is a structural schematic diagram of a second embodiment of a data transmission apparatus provided by an embodiment of the present application.

FIG. 16 is a structural schematic diagram of a second embodiment of a data transmission apparatus provided by an embodiment of the present application. As shown in FIG. 16, the data transmission apparatus 10 further includes:

a first receiving module 12, configured to receive configuration information, where the configuration information is used to determine the first transmission manner.

In an implementation, the first receiving module 12 is specifically configured to:

receive a system message, where the system message includes the configuration information; or, receive higher-layer signaling, where the higher-layer signaling includes the configuration information.

In an implementation, the configuration information includes a correspondence between a data type and a transmission manner.

Figure 17:
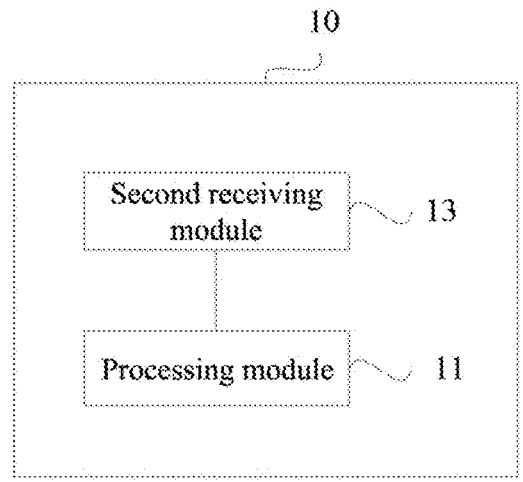
FIG. 17 is a structural schematic diagram of a third embodiment of a data transmission apparatus provided by an embodiment of the present application.

FIG. 17 is a structural schematic diagram of a third embodiment of a data transmission apparatus provided by an embodiment of the present application. As shown in FIG. 17, the data transmission device 10 further includes:

a second receiving module 13, configured to receive first information, where the first information is used to indicate that data to be transmitted by a network device is the first type of data; and the processing module 11 is further configured to determine the first transmission manner for the network device to transmit the first type according to a preset correspondence between a data type and a transmission mode, and the first information.

In an implementation, the first information includes any one of the following: an MAC CE; DCI; UCI; and an uplink message in a random access process.

Figure 18:
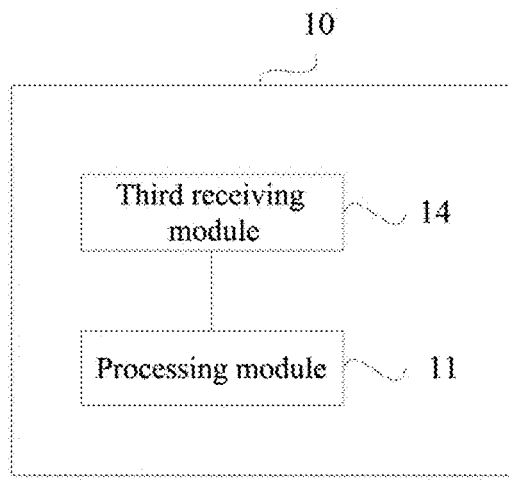
FIG. 18 is a structural schematic diagram of a fourth embodiment of a data transmission apparatus provided by an embodiment of the present application.

FIG. 18 is a structural schematic diagram of a fourth embodiment of a data transmission apparatus provided by an embodiment of the present application. As shown in FIG. 18, the data transmission apparatus 10 further includes:

a third receiving module 14, configured to receive second information, where the second information is used to activate the first transmission manner for transmitting the first type of data.

In an implementation, the second information includes an MAC CE or DCI.

In an implementation, the first verification mode includes: the first type of data being transmitted without performing a verification.

In an implementation, the first verification mode includes: performing a verification on the first type of data according to a first data granularity, where data of the first data granularity includes data of multiple sub-granularities; and determining that the verification fails when an error rate of the verification is greater than a first error rate for each data of the first data granularity;

where the error rate is used to indicate a number of sub-granularities with a verification error, or to indicate a proportion of sub-granularities with a verification error in the first data granularity.

In an implementation, at least one of the first data granularity, sub-granularity, and the first error rate is preset; or, at least one of the first data granularity, sub-granularity, and the first error rate is configured by a system message or higher-layer signaling; or, at least one of the first data granularity, sub-granularity, and the first error rate is activated through DCI or MAC CE among multiple parameters configured by higher-layer signaling.

In an implementation, the first verification mode includes: performing a verification on the first type of data according to a second data granularity; and determining the verification fails when an error rate of the verification is greater than a second error rate; where the error rate is used to indicate a number or a proportion of data with a verification error in the second data granularity.

In an implementation, the second data granularity and/or the second error rate are preset; or, the second data granularity and/or the second error rate are configured by a system message or higher layer signaling; or, the second data granularity and/or the second error rate are activated through DCI or MAC CE among multiple parameters configured by higher-layer signaling.

In an implementation, the verification includes a CRC verification.

In an implementation, the first retransmission mode includes:

the first type of data being transmitted without performing a retransmission feedback.

In an implementation, the first retransmission mode includes:

performing a detection on the first type of data according to a third data granularity, and data of the third data granularity includes data of multiple sub-granularities; and performing a retransmission feedback when an error rate of the detection is greater than a third error rate for each data of the third granularity data;

where the error rate is used to indicate a number of sub-granularities with a detection error, or to indicate a proportion of sub-granularities with a detection error in the third data granularity.

In an implementation, at least one of the third data granularity, sub-granularity, and the third error rate is preset; or, at least one of the third data granularity, sub-granularity, and the third error rate is configured by a system message or higher-layer signaling; or, at least one of the third data granularity, sub-granularity, and the third error rate is activated through DCI or MAC CE among multiple parameters configured by higher-layer signaling.

In an implementation, the first retransmission mode includes:

performing a detection on the first type of data according to a fourth data granularity; and determining to perform a retransmission feedback when an error rate is greater than a fourth error rate; where the error rate is used to indicate a proportion of data with a detection error in the fourth data granularity.

In an implementation, the fourth data granularity and/or the fourth error rate are preset; or, the fourth data granularity and/or the fourth error rate are configured by a system message or higher-layer signaling; or, the fourth data granularity and/or the fourth error rate are activated through DCI or MAC CE among multiple parameters configured by higher-layer signaling.

In an implementation, the retransmission feedback includes a HARQ feedback.

In an implementation, the first RLC mode includes:

not sending a notification message for notifying a data reception status.

In an implementation, the first RLC mode includes a UM mode or a TM mode.

In an implementation, the first RLC mode includes:

feeding back to a network device a notification message for notifying a data reception status when a number of data missing reaches a first threshold.

In an implementation, the first threshold is preset; or, the first threshold is configured by a system message or higher-layer signaling; or, the first threshold is activated through DCI or MAC CE among multiple thresholds configured by higher-layer signaling.

The data transmission apparatus provided by any of the above implementations is configured to implement the technical solution at the UE side in the foregoing method, and the implementation principles and technical effects therebetween are similar, which will not be repeated here.

Figure 19:
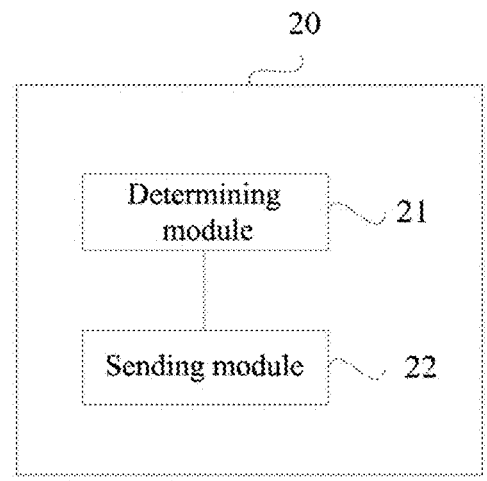
FIG. 19 is a structural schematic diagram of a fifth embodiment of a data transmission apparatus provided by an embodiment of the present application.

FIG. 19 is a structural schematic diagram of a fifth embodiment of a data transmission apparatus provided by an embodiment of the present application. As shown in FIG. 19, the data transmission apparatus 20 includes:

a sending module 22, configured to transmit first type of data to a user equipment (UE) according to a first transmission manner, where the first transmission manner includes at least one of the following: a first verification mode used for transmitting the first type of data, a retransmission mode used for transmitting the first type of data, and a first radio link control, RLC, mode used for transmitting the first type of data.

The data transmission apparatus provided in this embodiment is configured to implement the technical solution on the network device side in the foregoing method, and the implementation principles and technical effects therebetween are similar, which will not be repeated here.

On the basis of the foregoing embodiment, the data transmission apparatus 20 further includes:

a determining module 21, configured to determine the first transmission manner according to a pre-acquired correspondence between a data type and a transmission mode.

In an implementation, the sending module 22 is further configured to:

send configuration information, where the configuration information is used to determine the first transmission manner.

In an implementation, the sending module 22 is specifically configured to:

broadcast a system message, where the system message includes the configuration information; or, send higher-layer signaling, where the higher-layer signaling includes the configuration information.

In an implementation, the configuration information further includes a correspondence between a data type and a transmission mode.

In an implementation, the sending module 22 is further configured to:

send first information, where the first information is used to indicate that the data to be transmitted by the data transmission apparatus is the first type of data.

In an implementation, the first information includes any one of the following: a MAC CE; DCI; UCI; an uplink message in a random access process.

In an implementation, the sending module 22 is further configured to:

send second information, where the second information is used to activate the first transmission manner for transmitting the first type of data.

In an implementation, the second information includes an MAC CE or DCI.

In an implementation, the first verification mode includes:
the first type of data being transmitted without performing a verification.

In an implementation, the first verification mode includes:
performing a verification on the first type of data according to a first data granularity, where data of the first data granularity includes data of multiple sub-granularities; and
determining that the verification fails when an error rate of the verification is greater than a first error rate for each data of the first data granularity;

where the error rate is used to indicate a number of sub-granularities with a verification error, or to indicate a proportion of sub-granularities with a verification error in the first data granularity.

In an implementation, at least one of the first data granularity, sub-granularity, and the first error rate is preset; or,
at least one of the first data granularity, sub-granularity, and the first error rate is indicated through a system message or higher-layer signaling; or,
at least one of the first data granularity, sub-granularity, and the first error rate is activated through DCI or MAC CE among multiple parameters configured by higher-layer signaling.

In an implementation, the first verification mode includes:
performing a verification on the first type of data according to a second data granularity; and determining the verification fails when an error rate of the verification is greater than a second error rate; where the error rate is used to indicate a number or a proportion of data with a verification error in the second data granularity.

In an implementation, the second data granularity and/or the second error rate are preset; or,
the second data granularity and/or the second error rate are indicated through a system message or higher layer signaling; or,
the second data granularity and/or the second error rate are activated through DCI or MAC CE among multiple parameters configured by higher-layer signaling.

In an implementation, the verification includes a CRC verification.

In an implementation, the first retransmission mode includes:
the first type of data being transmitted without performing a retransmission feedback.

In an implementation, the first retransmission mode includes:
performing a detection on the first type of data according to a third data granularity, and data of the third data granularity includes data of multiple sub-granularities; and
performing a retransmission feedback when an error rate of the detection is greater than a third error rate for each data of the third granularity data;
where the error rate is used to indicate a number of sub-granularities with a detection error, or to indicate a proportion of sub-granularities with a detection error in the third data granularity.

In an implementation, at least one of the third data granularity, sub-granularity, and the third error rate is preset; or,
at least one of the third data granularity, sub-granularity, and the third error rate is indicated through a system message or higher-layer signaling; or,
at least one of the third data granularity, sub-granularity, and the third error rate is activated through DCI or MAC CE among multiple parameters configured by higher-layer signaling.

In an implementation, the first retransmission mode includes:
performing a detection on the first type of data according to a fourth data granularity; and determining to perform a retransmission feedback when an error rate is greater than a fourth error rate; where the error rate is used to indicate a proportion or an amount of data with a detection error in the fourth data granularity.

In an implementation, the fourth data granularity and/or the fourth error rate are preset; or, the fourth data granularity and/or the fourth error rate are indicated through a system message or higher-layer signaling; or, the fourth data granularity and/or the fourth error rate are activated through DCI or MAC CE among multiple parameters configured by higher-layer signaling.

In an implementation, the retransmission feedback includes a HARQ feedback.

In an implementation, the first RLC mode includes:
a notification message for notifying a data reception status being not sent.

In an implementation, the first RLC mode includes a UM mode or a TM mode.

In an implementation, the first RLC mode includes:
when the number of data missing reaches the first threshold, a notification message for notifying the data reception status is fed back to the network device.

In an implementation, the first threshold is preset; or,
the first threshold is indicated through a system message or higher-layer signaling; or,
the first threshold is activated through DCI or MAC CE among multiple thresholds configured by higher-layer signaling.

The data transmission apparatus provided by any of the above implementations is configured to implement the technical solution on the network device side in the foregoing method, and the implementation principles and technical effects therebetween are similar, which will not be repeated here.

Figure 20:
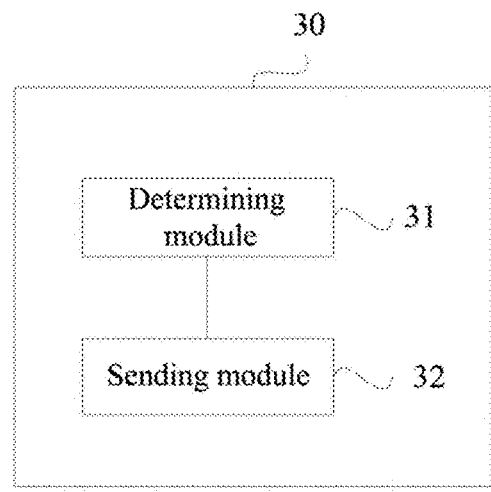
FIG. 20 is a structural schematic diagram of a sixth embodiment of a data transmission apparatus provided by an embodiment of the present application.

FIG. 20 is a structural schematic diagram of a sixth embodiment of a data transmission apparatus provided by an embodiment of the present application. As shown in FIG. 20, the data transmission apparatus 30 includes:
a determining module 31, configured to determine a first transmission manner, where the first transmission manner includes at least one of the following: a first verification mode used for transmitting first type of data, a retransmission mode used for transmitting the first type of data, and a first radio link control (RLC) mode used for transmitting the first type of data; and
a sending module 32, configured to transmit the first type of data to a network device according to the first transmission manner.

The data transmission apparatus provided in this embodiment is configured to implement the technical solution at the UE side in the aforementioned method, and the implementation principles and technical effects therebetween are similar, which will not be repeated here.

In an implementation, the determining module 31 is specifically configured to:
determine the first transmission manner according to a correspondence between a data type and a transmission mode specified in a protocol.

In an implementation, the determining module 31 is specifically configured to:
determine the first transmission manner according to a pre-configured correspondence between a data type and a transmission mode.

In an implementation, the sending module 32 is further configured to:
send first information, where the first information is used to indicate that the data to be transmitted by the data transmission apparatus is the first type of data.

In an implementation, the determining module 31 is further specifically configured to:

receive configuration information, where the configuration information is used to indicate the first transmission manner for transmitting the first type of data.

In an implementation, the first information includes UCI or uplink information in a random access process.

In an implementation, the determining module 31 is specifically configured to:
receive a system message, where the system message includes the configuration information; or,
receive higher-layer signaling, where the higher-layer signaling includes the configuration information.

In an implementation, the first verification mode includes:
the first type of data being transmitted without performing a verification.

In an implementation, the first verification mode includes:
performing a verification on the first type of data according to a first data granularity, where data of the first data granularity includes data of multiple sub-granularities; and
determining that the verification fails when an error rate of the verification is greater than a first error rate for each data of the first data granularity;
where the error rate is used to indicate a number of sub-granularities with a verification error, or to indicate a proportion of sub-granularities with a verification error in the first data granularity.

In an implementation, at least one of the first data granularity, sub-granularity, and the first error rate is preset; or,
at least one of the first data granularity, sub-granularity, and the first error rate is indicated by a system message or higher-layer signaling; or,
at least one of the first data granularity, sub-granularity, and the first error rate is activated through DCI or MAC CE among multiple parameters configured by higher-layer signaling.

In an implementation, the first verification mode includes:
performing a verification on the first type of data according to a second data granularity; and determining the verification fails when an error rate of the verification is greater than a second error rate; where the error rate is used to indicate a number or a proportion of data with a verification error in the second data granularity.

In an implementation, the second data granularity and/or the second error rate are preset; or,
the second data granularity and/or the second error rate are indicated by a system message or higher layer signaling; or,
the second data granularity and/or the second error rate are activated through DCI or MAC CE among multiple parameters configured by higher-layer signaling.

In an implementation, the verification includes a CRC verification.

In an implementation, the first retransmission mode includes:
the first type of data being transmitted without performing a retransmission feedback.

In an implementation, the first retransmission mode includes:
performing a detection on the first type of data according to a third data granularity, and data of the third data granularity includes data of multiple sub-granularities; and
performing a retransmission feedback when an error rate of the detection is greater than a third error rate for each data of the third granularity data;

where the error rate is used to indicate a number of sub-granularities with a detection error, or to indicate a proportion of sub-granularities with a detection error in the third data granularity.

In an implementation, at least one of the third data granularity, sub-granularity, and the third error rate is preset; or, at least one of the third data granularity, sub-granularity, and the third error rate is indicated by a system message or higher-layer signaling; or, at least one of the third data granularity, sub-granularity, and the third error rate is activated through DCI or MAC CE among multiple parameters configured by higher-layer signaling.

In an implementation, the first retransmission mode includes:

detecting the first type of data according to a fourth data granularity; and performing a detection on to perform a retransmission feedback when an error rate is greater than a fourth error rate; where the error rate is used to indicate a proportion or an amount of data with a detection error in the fourth data granularity.

In an implementation, the fourth data granularity and/or the fourth error rate are preset; or, the fourth data granularity and/or the fourth error rate are indicated by a system message or higher-layer signaling; or, the fourth data granularity and/or the fourth error rate are activated through DCI or MAC CE among multiple parameters configured by higher-layer signaling.

In an implementation, the retransmission feedback includes a HARQ feedback.

In an implementation, the first RLC mode includes:

a notification message for notifying a data reception status being not sent.

In an implementation, the first RLC mode includes a UM mode or a TM mode.

In an implementation, the first RLC mode includes:

feeding back to the UE a notification message for notifying a data reception status when a number of data missing reaches a first threshold.

In an implementation, the first threshold is preset; or, the first threshold is indicated by a system message or higher-layer signaling; or, the first threshold is activated through DCI or MAC CE among multiple thresholds configured by higher-layer signaling.

The data transmission apparatus provided by any of the foregoing implementations is configured to implement the technical solution at the UE side in the foregoing method, and its implementation principles and technical effects are similar, which will not be repeated here.

Figure 21:
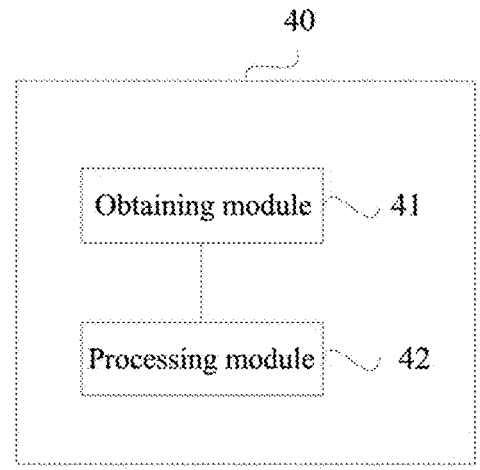
FIG. 21 is a structural schematic diagram of a seventh embodiment of a data transmission apparatus provided by an embodiment of the present application.

FIG. 21 is a structural schematic diagram of a seventh embodiment of a data transmission apparatus provided by an embodiment of the present application. As shown in FIG. 21, the data transmission apparatus 40 includes:

an obtaining module 41, configured to obtain a first transmission manner, where the first transmission manner includes at least one of the following: a first verification mode used for transmitting first type of data, a retransmission mode used for transmitting the first type of data, and a first radio link control (RLC) mode used for transmitting the first type of data; and a processing module 42, configured to obtain the first type of data according to the first transmission manner.

The data transmission apparatus provided in this embodiment is configured to implement the technical solution on the network device side in any of the foregoing method embodiments, and the implementation principles and technical effects therebetween are not repeated here.

Figure 22:
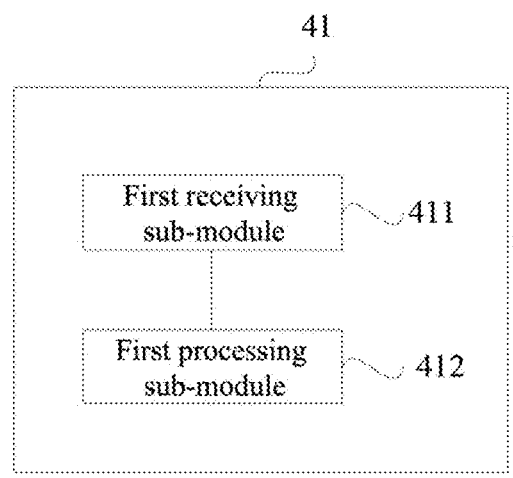
FIG. 22 is a structural schematic diagram of an eighth embodiment of a data transmission apparatus provided by an embodiment of the present application.

On the basis of the above embodiment, FIG. 22 is a structural schematic diagram of an eighth embodiment of a data transmission apparatus provided by an embodiment of the present application. As shown in FIG. 22, the obtaining module 41 includes:

a first receiving sub-module 411, configured to receive first information, where the first information is used to indicate that the data to be transmitted by UE is the first type of data; and a first processing sub-module 412, configured to determine the first transmission manner according a pre-acquired correspondence between a data type and a transmission mode, and the first information.

In an implementation, the first information includes a UCI or an uplink information in a random access process.

In an implementation, the correspondence between the data type and the transmission mode is preset.

Figure 23:
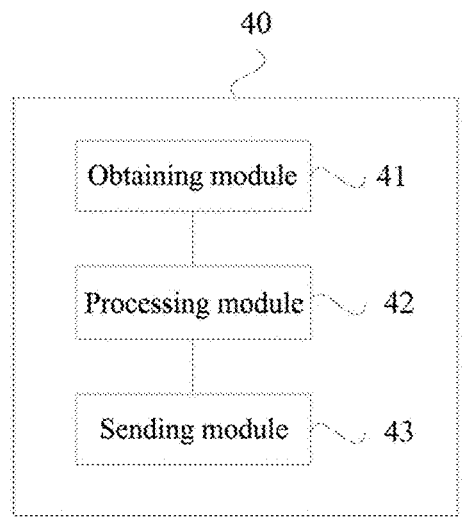
FIG. 23 is a structural schematic diagram of a ninth embodiment of a data transmission apparatus provided by an embodiment of the present application.

FIG. 23 is a structural schematic diagram of a ninth embodiment of a data transmission apparatus provided by an embodiment of the present application. As shown in FIG. 23, the data transmission apparatus 40 further includes:

a sending module 43, configured to send configuration information, where the configuration information is used to determine the first transmission manner.

In an implementation, the sending module 43 is specifically configured to:

broadcast a system message, where the system message includes the configuration information; or, send radio link control higher-layer signaling, where the higher-layer signaling includes the configuration information.

In an implementation, the first verification mode includes:

the first type of data being transmitted without performing a verification.

In an implementation, the first verification mode includes:

performing a verification on the first type of data according to a first data granularity, where data of the first data granularity includes data of multiple sub-granularities; and determining that the verification fails when an error rate of the verification is greater than a first error rate for each data of the first data granularity;

where the error rate is used to indicate a number of sub-granularities with a verification error, or to indicate a proportion of sub-granularities with a verification error in the first data granularity.

In an implementation, at least one of the first data granularity, sub-granularity, and the first error rate is preset; or, at least one of the first data granularity, sub-granularity, and the first error rate is configured through a system message or higher-layer signaling; or, at least one of the first data granularity, sub-granularity, and the first error rate is activated through DCI or MAC CE among multiple parameters configured by higher-layer signaling.

In an implementation, the first verification mode includes:

performing a verification on the first type of data according to a second data granularity; and determining the verification fails when an error rate of the verification is greater than a second error rate; where the error rate is used to indicate a number or a proportion of data with a verification error in the second data granularity.

In an implementation, the second data granularity and/or the second error rate are preset; or, the second data granularity and/or the second error rate are configured through a system message or higher layer signaling; or, the second data granularity and/or the second error rate are activated through DCI or MAC CE among multiple parameters configured by higher-layer signaling.

In an implementation, the verification includes a CRC verification.

In an implementation, the first retransmission mode includes:

the first type of data being transmitted without performing a retransmission feedback.

In an implementation, the first retransmission mode includes:

performing a detection on the first type of data according to a third data granularity, and data of the third data granularity includes data of multiple sub-granularities; and performing a retransmission feedback when an error rate of the detection is greater than a third error rate for each data of the third granularity data;

where the error rate is used to indicate a number of sub-granularities with a detection error, or to indicate a proportion of sub-granularities with a detection error in the third data granularity.

In an implementation, at least one of the third data granularity, sub-granularity, and the third error rate is preset; or, at least one of the third data granularity, sub-granularity, and the third error rate is configured through a system message or higher-layer signaling; or, at least one of the third data granularity, sub-granularity, and the third error rate is activated through DCI or MAC CE among multiple parameters configured by higher-layer signaling.

In an implementation, the first retransmission mode includes:

performing a detection on the first type of data according to a fourth data granularity; and determining to perform a retransmission feedback when an error rate is greater than a fourth error rate; where the error rate is used to indicate a proportion or an amount of data with a detection error in the fourth data granularity.

In an implementation, the fourth data granularity and/or the fourth error rate are preset; or, the fourth data granularity and/or the fourth error rate are configured through a system message or higher-layer signaling; or, the fourth data granularity and/or the fourth error rate are activated through DCI or MAC CE among multiple parameters configured by higher-layer signaling.

In an implementation, the retransmission feedback includes a HARQ feedback.

In an implementation, the first RLC mode includes:

a notification message for notifying a data reception status being not sent.

In an implementation, the RLC mode includes a UM mode or a TM mode.

In an implementation, the first RLC mode includes:

feeding back to the UE a notification message for notifying a data reception status when a number of data missing reaches a first threshold.

In an implementation, the first threshold is preset; or, the first threshold is configured through a system message or higher-layer signaling; or, the first threshold is activated through DCI or MAC CE among multiple thresholds configured by higher-layer signaling.

Figure 24:
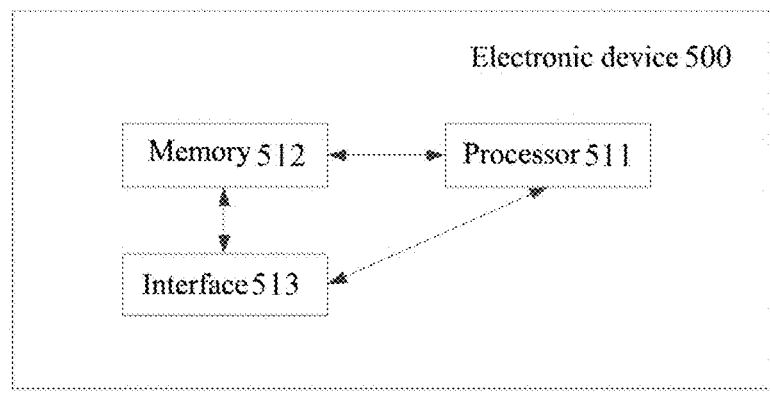
FIG. 24 is a structural schematic diagram of a first embodiment of an electronic device provided by an embodiment of the present application.

FIG. 24 is a structural schematic diagram of a first embodiment of an electronic device provided by an embodiment of the present application. As shown in FIG. 24, the electronic device 500 includes:

a processor 511, a memory 512, and an interface 513 for communicating with a network device; where the memory 512 stores computer-executable instructions; and the processor 511 executes the computer-executable instructions stored in the memory 512, to enable the processor 511 to execute the technical solution of the UE or one device of the device-to-device in any of the foregoing embodiments.

FIG. 24 is a simple design of the electronic device. The embodiments of the present application does not limit the number of processors and memories in the user equipment. FIG. 24 only takes the number of one as an example for illustration.

Figure 25:
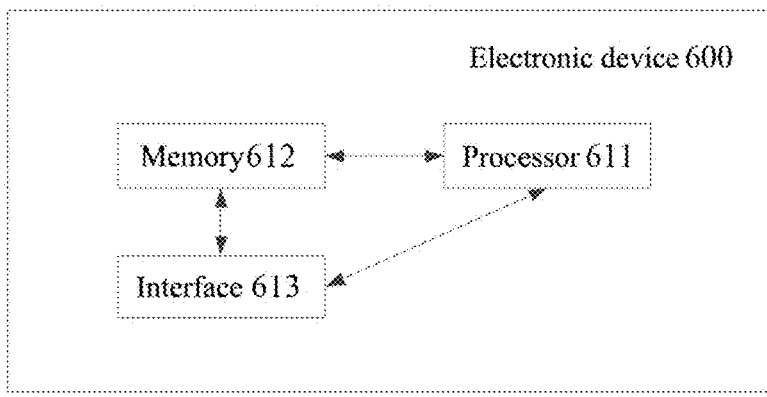
FIG. 25 is a structural schematic diagram of a second embodiment of an electronic device provided by an embodiment of the present application.

FIG. 25 is a structural schematic diagram of a second embodiment of an electronic device provided by an embodiment of the present application. As shown in FIG. 25, the electronic device 600 includes:

a processor 611, a memory 612, and an interface 613 for communicating with the electronic device shown in FIG. 24; where the memory 612 stores computer-executable instructions; and the processor 611 executes the computer-executable instructions stored in the memory 612, to enable the processor 611 to execute the technical solution of the UE or the other device of the device-to-device in any of the foregoing embodiments.

FIG. 25 is a simple design of the electronic device. The embodiments of the present application does not limit the number of processors and memories in the user equipment. FIG. 25 only takes the number of one as an example for illustration.

In a specific implementation of the device shown in FIG. 24 and the device described in FIG. 25, the memory, the processor, and the interface may be connected by a bus. In an implementation, the memory may be integrated inside the processor.

The present application also provides a computer-readable storage medium, where the computer-readable storage medium stores computer-executable instructions, and the computer-executable instructions are configured to implement the technical solution of the UE side or one device of the device-to-device in any of the foregoing embodiments when being executed by a processor.

The present application further provides a computer-readable storage medium, where the computer-readable storage medium stores computer-executable instructions, and the computer-executable instructions are configured to implement the technical solution of the network device side or the other one device of the device-to-device in any of the foregoing embodiments when being executed by a processor.

An embodiment of the present application further provides a program, where the program is configured to execute the technical solution of the UE or one device of the device-to-device in any of the foregoing method embodiments when being executed by a processor.

An embodiment of the present application further provides a program, where the program is configured to execute the technical solution of the network device side or the other one device of the device-to-device in any of the foregoing method embodiments when being executed by a processor.

In an implementation, the foregoing processor may be a chip.

An embodiments of the present application further provides a computer program product, including program instructions, where the program instructions are configured to implement the technical solution of the UE or one device of the device-to-device in any of the foregoing method embodiments.

An embodiments of the present application further provides a computer program product, including program instructions, where the program instructions are configured to implement the technical solution of the network device or the other one device side of the device-to-device in any of the foregoing method embodiments.

An embodiment of the present application further provides a chip, which includes a processing module and a communication interface, where the processing module can execute the technical solution at the UE side of one device of the device-to-device in any of the foregoing method embodiments.

Furthermore, the chip further includes a storage module (such as a memory), the storage module is configured to store instructions, the processing module is configured to execute the instructions stored in the storage module, and the execute of the instructions stored in the storage module to lead that the processing module executes the technical solution of the UE side or one device of the device-to-device in any of the foregoing in the method embodiment.

An embodiment of the present application further provides a chip, which includes a processing module and a communication interface, where the processing module can execute the technical solution of the network device side or the other one device side of the device-to-device in any of the foregoing method embodiments.

Furthermore, the chip further includes a storage module (such as a memory), the storage module is configured to store instructions, the processing module is configured to execute the instructions stored in the storage module, and the execute of the instructions stored in the storage module to lead that the processing module executes the technical solution of the network device side or the other one device of the device-to-device in any of the foregoing in the method embodiment.

In the several embodiments provided in the present application, it should be understood that the disclosed device and method may be implemented in other ways. For example, the device embodiments described above are only illustrative. For example, the division of the modules is only a logical function division, and there may be other divisions in actual implementation, for example, multiple modules can be combined or integrated to another system, or some features can be ignored, or not implemented. In addition, the displayed or discussed mutual coupling or direct coupling or communication connection may be through some interfaces, and the indirect coupling or communication connection of the modules may be in electrical, mechanical or other forms.

In the specific implementation of the aforementioned user equipment and network device, it should be understood that the processor may be a central processing unit (abbreviation: CPU), or other general-purpose processors, digital signal processors (abbreviation: DSP), application specific integrated circuit (abbreviation: ASIC), etc. The general-purpose processor may be a microprocessor or the processor may also be any conventional processor or the like. The steps of the method disclosed in the present application may be directly embodied as being executed and completed by a hardware processor, or executed and completed by a combination of hardware and software modules in the processor.

All or a part of the steps in the aforementioned method embodiments may be implemented by a hardware relating to program instructions. The aforementioned program may be stored in a readable memory. When the program is executed, the steps including the aforementioned method embodiments are executed; and the foregoing memory (storage medium) includes: a read-only memory (abbreviation: ROM), a random access memory (abbreviation: RAM), a flash memory, a hard disk, a solid state drive, a magnetic tape, a floppy disk, an optical disc and any combination thereof.

What is claimed is:

1. A data transmission method applied to a first device, the method comprises:
   obtaining first type of data from a second device according to a first transmission manner, wherein the first transmission manner comprises at least one of the following: a first verification mode used for transmitting the first type of data, a retransmission mode used for transmitting the first type of data, and a first radio link control (RLC) mode used for transmitting the first type of data; and
   receiving configuration information from the second device, wherein the configuration information is used to determine the first transmission manner, and the configuration information comprises a correspondence between a data type and a transmission manner;
   wherein the receiving the configuration information comprises:
   receiving a system message, wherein the system message comprises the configuration information; or,
   receiving higher-layer signaling, wherein the higher-layer signaling comprises the configuration information.

2. The method according to claim 1, wherein the method further comprises:
   receiving first information, wherein the first information is used to indicate that data to be transmitted by a network device is the first type of data; and
   determining, according to a preset correspondence between a data type and a transmission mode, and the first information, the first transmission manner for the network device to transmit the first type of data.

3. An electronic device, comprising:
   a processor, a memory, and an interface for communicating with another electronic device; wherein
   the memory stores computer-executable instructions; and
   the processor executes the computer-executable instructions stored in the memory to enable the processor to:
   obtain first type of data from a second device according to a first transmission manner, wherein the first transmission manner comprises at least one of the following: a first verification mode used for transmitting the first type of data, a retransmission mode used for transmitting the first type of data, and a first radio link control (RLC) mode used for transmitting the first type of data; and
   receive configuration information from the second device, wherein the configuration information is used to determine the first transmission manner, and the configuration information comprises a correspondence between a data type and a transmission manner;

wherein the processor is specifically configured to:
receive a system message, wherein the system message comprises the configuration information; or,
receive higher-layer signaling, wherein the higher-layer signaling comprises the configuration information.

4. The electronic device according to claim 3, wherein the first verification mode comprises:
the first type of data being transmitted without performing a verification.

5. The electronic device according to claim 3, wherein the first verification mode comprises:
performing a verification on the first type of data according to a first data granularity, wherein data of the first data granularity comprises data of multiple sub-granularities; and
determining that the verification fails when an error rate of the verification is greater than a first error rate for each data of the first data granularity;
wherein the error rate is used to indicate a number of sub-granularities with a verification error, or to indicate a proportion of sub-granularities with a verification error in the first data granularity.

6. The electronic device according to claim 3, wherein the first retransmission mode comprises:
the first type of data being transmitted without performing a retransmission feedback.

7. The electronic device according to claim 3, wherein the first retransmission mode comprises:
performing a detection on the first type of data according to a third data granularity, and data of the third data granularity comprises data of multiple sub-granularities; and
performing a retransmission feedback when an error rate of the detection is greater than a third error rate for each data of the third granularity data;
wherein the error rate is used to indicate a number of sub-granularities with a detection error, or to indicate a proportion of sub-granularities with a detection error in the third data granularity.

8. The electronic device according to claim 3, wherein the first RLC mode comprises:
a notification message for notifying a data reception status being not sent.

9. The electronic device according to claim 3, wherein the first RLC mode comprises:
feeding back to a network device a notification message for notifying a data reception status when a number of data missing reaches a first threshold.

10. An electronic device, comprising:
a processor, a memory, and an interface for communicating with another electronic device; wherein
the memory stores computer-executable instructions; and
the processor executes the computer-executable instructions stored in the memory to enable the processor to:
transmit first type of data to a first device according to a first transmission manner, wherein the first transmission manner comprises at least one of the following: a first verification mode used for transmitting the first type of data, a retransmission mode used for transmitting the first type of data, and a first radio link control (RLC) mode used for transmitting the first type of data; and
send configuration information, wherein the configuration information is used to determine the first transmission manner, the configuration information further comprises a correspondence between a data type and a transmission mode;
wherein the processor is specifically configured to:
broadcast a system message, wherein the system message comprises the configuration information; or,
send higher-layer signaling, wherein the higher-layer signaling comprises the configuration information.

11. The electronic device according to claim 10, wherein the processor is further configured to:
send first information, wherein the first information is used to indicate that the data to be transmitted by the electronic device is the first type of data.

12. The electronic device according to claim 11, wherein the first information comprises any one of the following:
a media access control-control unit (MAC-CE);
downlink control information (DCI);
uplink control information (UCI); and
an uplink message during a random access process.

13. The electronic device according to claim 10, wherein the first verification mode comprises:
the first type of data being transmitted without performing a verification.

14. The electronic device according to claim 10, wherein the first retransmission mode comprises:
the first type of data being transmitted without performing a retransmission feedback.

15. The electronic device according to claim 10, wherein the first RLC mode comprises:
a notification message for notifying a data reception status being not sent.

* * * * *